United States Patent [19]

Hirata et al.

[11] Patent Number: 5,327,560
[45] Date of Patent: Jul. 5, 1994

[54] METHOD OF UPDATING NETWORK RECONFIGURATION INFORMATION EXCHANGED BETWEEN A HOST COMPUTER AND A COMMUNICATION CONTROL PROCESSOR

[75] Inventors: Toshiaki Hirata, Kawasaki; Akira Mineo, Sagamihara; Hidenori Shimizu, Yokohama; Takeshi Kondo, Kawasaki; Kazuo Yagyu, Hiratsuka, all of Japan

[73] Assignee: Hitachi, Ltd., Tokyo, Japan

[21] Appl. No.: 735,629

[22] Filed: Jul. 25, 1991

[30] Foreign Application Priority Data

Jul. 30, 1990 [JP] Japan ................ 2-199292

[51] Int. Cl.⁵ ............................................. G06F 9/44
[52] U.S. Cl. ................................. 395/700; 364/232.2;
  364/242.94; 364/280.2; 364/280
[58] Field of Search ............. 395/700, 200, 650

[56] References Cited

U.S. PATENT DOCUMENTS

| 4,920,529 | 4/1990 | Sasaki et al. | 370/16 |
| 4,993,014 | 2/1991 | Gordon | 370/16 |
| 5,048,014 | 9/1991 | Fischer | 370/85.5 |
| 5,077,732 | 12/1991 | Fischer et al. | 370/85.4 |
| 5,138,615 | 8/1992 | Lamport et al. | 370/94.3 |

FOREIGN PATENT DOCUMENTS 63-156264  6/1988  Japan ................ G06F 13/00

Primary Examiner—Kevin A. Kriess
Attorney, Agent, or Firm—Fay, Sharpe, Beall, Fagan, Minnich & McKee

[57] ABSTRACT

A method for use in a network having a plurality of host computers, at least one communication control processor (CCP) commonly connected to the host computers, and a plurality of resources connected to the CCP. According to the method, if a resource is to be added to or deleted from the network, an operator designates a reconfiguration directory including at least one reconfiguration designating data for defining a relation between the network and a resource to be changed. Each host computer is assigned a reconfiguration command. In response to this reconfiguration command, each host computer reconfigures its own network configuration definition information in accordance with the defined reconfiguration designating data within the designated reconfiguration directory. If the designated reconfiguration directory contains the reconfiguration designating data related to a resource to be connected to the CCP, a host computer operating as a master, issues a control command to the CCP in conformity with the reconfiguration designating data in order to reconfigure the network configuration definition information of the CCP.

16 Claims, 37 Drawing Sheets

FIG. 13

M1 — | RECONFIGURATION IDENTIFIER (ADDITION) 46 | KIND OF MESSAGE (REQUEST) 47 | NAME OF DESTINATION RESOURCE 48 | CONTROL INFORMATION IN ADDITIONAL TABLE 49 |

M2 — | RECONFIGURATION IDENTIFIER (ADDITION) 46 | KIND OF MESSAGE (RESPONSE) 47 | NAME OF DESTINATION RESOURCE 48 | SUCCESS/ FAILURE 50 |

FIG. 14

M3 — | RECONFIGURATION IDENTIFIER (DELETION) 46 | KIND OF MESSAGE (REQUEST) 47 | NAME OF RESOURCE TO BE DELETED 51 |

M4 — | RECONFIGURATION IDENTIFIER (DELETION) 46 | KIND OF MESSAGE (RESPONSE) 47 | NAME OF RESOURCE TO BE DELETED 51 | SUCCESS/ FAILURE 50 |

METHOD OF UPDATING NETWORK RECONFIGURATION INFORMATION EXCHANGED BETWEEN A HOST COMPUTER AND A COMMUNICATION CONTROL PROCESSOR

BACKGROUND OF THE INVENTION

The present invention relates to a method of processing network reconfiguration information. More particularly, the present invention relates to a method of processing reconfiguration information of a network composed of at least one host computer, a communication control processor (hereinafter called CCP) connected to the host computer, and a plurality of resources connected to the CCP, suitable for dynamically changing the network configuration information of the host computer and CCP under operation.

In a conventional technique for dynamically changing the network configuration information of a CCP, there is disclosed, for example, in Japanese Patent Laid-open Publication JP-A-63-156264, a reconfiguration information processing system in which, as a reconfiguration command is entered from a host computer, the reconfiguration data of the host computer is sent to the CCP which in turn dynamically changes its own reconfiguration definition information in accordance with the reconfiguration data sent from the host computer. This Publication also discloses that the host computer sequentially stores inputted reconfiguration commands in a history infoldnation file, and when an NCP load module is loaded to the CCP, the reconfiguration data associated with the previously entered reconfiguration commands and read from the history information file is sent to the NCP, so that the CCP automatically reconfigure its original network configuration definition information as if the reconfiguration commands were actually entered again.

In a computer network, if for example the reconfiguration information designated by the reconfiguration command contradicts with the physical network structure to be actually changed, it becomes necessary to change the reconfiguration information to the proper information. However, the above-described example technique does not disclose an effective method of changing such a defective reconfiguration command to a proper one.

Furthermore, according to the above-described example technique, the network configuration information at a CCP side becomes coincident with that at a host computer when the CCP restarts its operation. However, if the host computer restarts its operation upon loading a program while the CCP is already operating, the host computer does not send the reconfiguration data to the CCP. Accordingly, if there is a reconfiguration command whose reconfiguration process failed previously at the CCP because of some trouble, there occurs a problem that the host computer restarts, having an inconsistency of configuration definitions between the host computer and CCP.

Still further, in a network arrangement having a single CCP connected to a plurality of host computers, consider the case where a host computer having operated as a slave is changed to a master. In this case, if the new master host computer happens to forget entering a necessary reconfiguration command existing in the past, there occurs an inconsistency of reconfiguration definition information between the master host computer and CCP.

SUMMARY OF THE INVENTION

It is therefore an object of the present invention to provide a method of processing configuration definition information of a network composed of at least one host computer, and at least one CCP, capable of dynamically and easily changing the network configuration definition information of both the host computer and CCP.

It is another object of the present invention to provide a method of processing network configuration definition information, capable of canceling an erroneous reconfiguration of configuration definition information caused upon execution of a reconfiguration command and easily correcting the reconfiguration definition command to a proper one.

It is a further object of the present invention to provide a method of processing configuration definition information of a network composed of a plurality of host computers and at least one CCP commonly connected to the plurality of host computers, one of which operates as a master and the others operates as slaves, capable of easily correcting an inconsistence of network configuration definition information between each host computer and CCP.

In order to achieve the above objects, a method of processing reconfiguration information for a network according to the present invention comprises the steps of:

arranging a reconfiguration directory to a host computer, the reconfiguration directory including at least one reconfiguration designating data for defining a relation between the network and a resource to be deleted from or added to the network;

designating the reconfiguration directory and giving a reconfiguration command for reconfigurating the network configuration definition information, to the host computer; and responsive to the reconfiguration command, causing the host computer to reconfigure the network configuration definition information in accordance with the defined reconfiguration designating data within the reconfiguration directory designated by the reconfiguration command.

The network reconfiguration information processing method according to the present invention, further comprises the steps of:

storing the reconfiguration directory in a directory file;

designating one of the reconfiguration directories stored in the directory file, and giving to the host computer a cancel command for canceling the already executed reconfiguration of the network configuration definition information; and responsive to the cancel command, causing the host computer to cancel the reconfiguration of the network configuration definition information already executed in accordance with the defined reconfiguration designating data within the designated reconfiguration directory, restore the network configuration definition information before the reconfiguration, and delete the designated reconfiguration directory from the directory file.

In this case, if the designated reconfiguration directory contains the reconfiguration designates data for a plurality of resources: the reconfiguration of the network configuration definition information to be executed in response to the reconfiguration command is executed such that a resource is sequentially added to or deleted from the network, in the order that the reconfiguration designating data was described in the reconfiguration directory; and the cancel of the reconfiguration of the network configuration definition information to be executed in response to the cancel command is executed in the reverse order of having described the reconfiguration designating data in the reconfiguration directory.

If the reconfiguration command or the reconfiguration command designated by the cancel command contains the reconfiguration designating data related to a source to be connected to the CCP, the host computer gives to the CCP "a control command for reconfiguring the network configuration definition information of the CCP in accordance with the reconfiguration designating data; and in responsive to the control command the CCP reconfigures the network configuration definition information of the CCP.

According to one aspect of the present invention, the network reconfiguration information processing method, further comprises the steps of:

causing the host computer to store the reconfiguration command in a reconfiguration history file; and after executing the cancel command, causing the host computer to delete the reconfiguration command corresponding to the reconfiguration directory designated by the cancel command, from the reconfiguration history file.

The network configuration definition information of the host computer includes original network configuration definition information and current network configuration definition information obtained by reconfiguring the original network configuration definition information, and when the operation of the host computer restarts upon loading a program, the host computer sequentially reconfigures the original network configuration definition information in accordance with the reconfiguration command read from the reconfiguration history file to generate the current network configuration definition information.

According to another aspect of the present invention, there is provided a method of processing reconfiguration information for a network having network configuration definition information, the network including a plurality of host computers one of which operates as a master and the others operate as slaves, at least one communication control processor (hereinafter called CCP) commonly connected to the host computers, and a plurality of resources connected to the CCP, the network reconfiguration information processing method comprises the steps of:

arranging a reconfiguration directory to each of the host computers, the reconfiguration directory including at least one reconfiguration designating data for defining a relation between the network and a resource to be deleted from or added to the network;

designating the reconfiguration directory and giving a reconfiguration command for reconfiguring the network configuration definition information, to each of the host computers;

responsive to the reconfiguration command, causing each of the host computers to reconfigure the network configuration definition information of each of the host computers in accordance with the defined reconfiguration designating data within the reconfiguration directory designated by the reconfiguration command, and store the designated reconfiguration directory in a directory file; and if the reconfiguration directory designated by the reconfiguration command contains the reconfiguration designating data related to a resource to be connected to the CCP, causing the master host computer to give to the CCP a control command for reconfiguring the network configuration definition information of the CCP in accordance with the reconfiguration designating data, to thereby reconfigure the network configuration definition information of the CCP in response to the control command.

If the reconfiguration of the configuration definition information already executed by the reconfiguration command is to be canceled, this cancel is executed by the following steps:

designating one of the reconfiguration directories stored in the directory file, and giving to one of the host computers a cancel command for canceling the already executed reconfiguration of the network configuration definition information;

responsive to the cancel command, causing each of the host computers to cancel the reconfiguration of the network configuration definition information of each of the host computers already executed in accordance with the defined reconfiguration designating data within the designated reconfiguration directory, restore the network configuration definition information before the reconfiguration, and delete the designated reconfiguration directory from the directory file; and if the reconfiguration directory designated by the cancel command contains the reconfiguration designating data related to a resource to be connected to the CCP, causing the master host computer to give to the CCP a control command for canceling a part of the reconfiguration of the network configuration definition information of the CCP in accordance with the reconfiguration designating data, to thereby cancel the reconfiguration of the network configuration definition information of the CCP in response to the control command.

According to still another aspect of the present invention, there is provided a method of processing reconfiguration information for a network having network configuration definition information, the network including a plurality of host computers one of which operates as a master and the others operate as slaves, at least one communication control processor (hereinafter called CCP) commonly connected to the host computers, and a plurality of resources connected to the CCP, the network reconfiguration information processing method comprises the steps of:

designating one of reconfiguration directories and inputting to one of the host computers a command for reconfiguring the network configuration definition information of the one host computer, the reconfiguration directory including a reconfiguration designating data related to at least one resource to be added to or deleted from the network;

causing the one host computer to reconfigure the network configuration definition information of the one host computer in accordance with the kind of the inputted command and the contents of the reconfiguration directory;

if the one host computer is a master and if the reconfiguration directory contains the reconfiguration designating data related to a resource to be connected to the CCP, causing the master host computer to give to the CCP a control command for "reconfigure the network configuration definition information of the CCP in accordance with the kind of the inputted command and the contents of the reconfiguration designating data, the control command including a reconfiguration sequence number in correspondence with the reconfiguration directory, and an indicator for indicating if the reconfiguration directory is the last one to be executed by the CCP;

updating first status information stored correspondence with the reconfiguration sequence number in accordance with whether or not the CCP executed the control command from the master host computer has successfully reconfigured the network configuration definition information, and transmitting a response message to the control command to the master host computer, the response message including information representative of whether or not the network configuration definition information has been executed successfully; and causing the master host computer to update second status information stored in correspondence with the reconfiguration sequence number in accordance with the contents of the response message received from the CCP.

By storing status information in CCP and the master host computer, it becomes possible, for example, to identify the reconfiguration directory to be executed again for the reconfiguration, by causing, in response to a request from the master host computer after the operation of the master host computer restarts, the CCP to inform the master host computer of all reconfiguration numbers stored in the CCP and the first status information, by causing the master host computer to compare the reconfiguration sequence numbers and the first status information received from the CCP with reconfiguration sequence numbers and the second status information stored in the host computer, and by using the comparison result. If the comparison result indicates a presence of inconsistency between the reconfiguration sequence numbers, the reconfiguration is executed as to the reconfiguration commands after this sequence number.

The foregoing and other objects, advantages, manner of operation and novel features of the present invention will be understood from the following detailed description when read in connection with the accompanying drawings.

BRIEF DESCRIPTION OF THE DRAWINGS

FIG. 13 shows the formats of a reconfiguration request message M1 for resource addition sent from a host computer to CCP, and a response message M2 from CCP;

FIG. 14 shows the formats of a reconfiguration request message M3 for resource deletion sent from a host computer to CCP, and a response message M4 from CCP;

DESCRIPTION OF THE PREFERRED EMBODIMENTS

Figure 2:
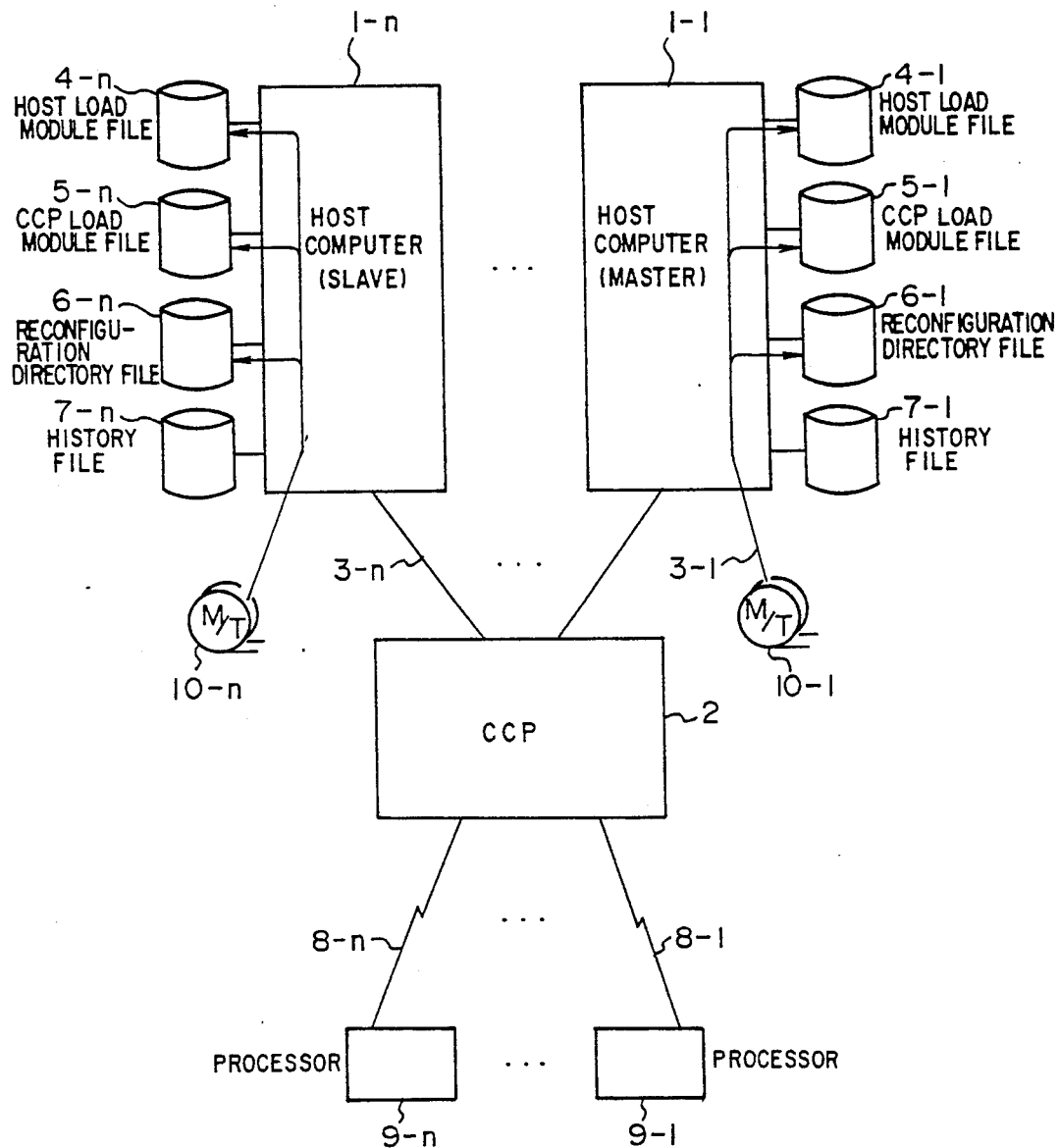
FIG. 2 is a diagram showing the fundamental configuration of a computer network system embodying the present invention.

FIG. 2 shows the system configuration according to an embodiment of the present invention. Reference numerals 1-l to 1-n represent host computers, one of which (e.g., 1-l) operates as a master and the others operate as slaves. Each host computer executes an execution image program loaded therein, the program containing network configuration definition information of the resources to be managed or controlled by the host computer. Reference numeral 2 represents a communication control processor (CCP) which executes an execution image program loaded therein, the program containing network configuration definition information of the resources to be controlled by CCP. Host computers and CCP are linked together by channels 3-l to 3-n for message transfer therebetween. Messages are transferred between CCP and other processors 9-l to 9-n via a plurality of communication paths 8-l to 8-n.

Figure 3:
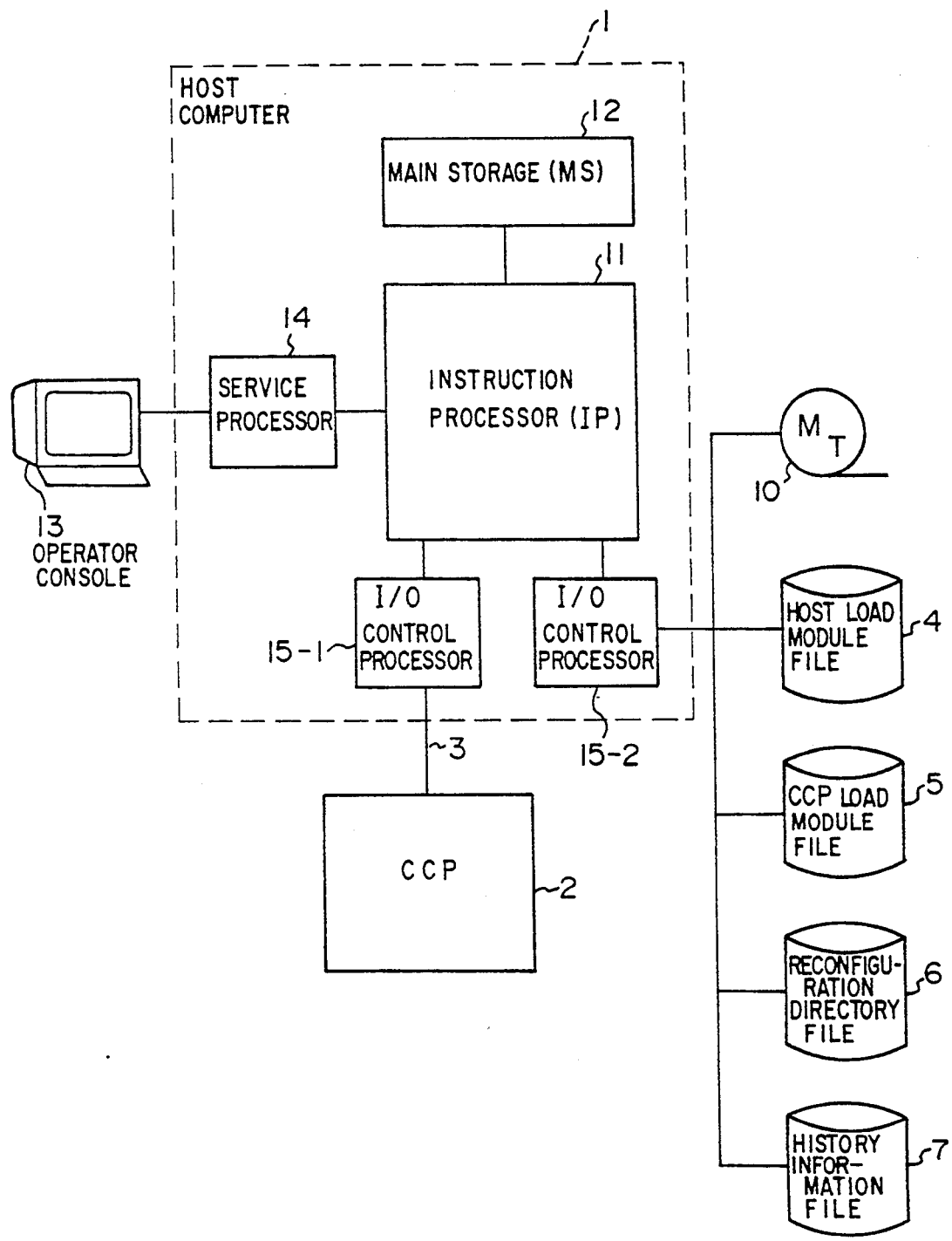
FIG. 3 shows the hardware structure of a host computer.

FIG. 3 shows the hardware structure of a host computer 1. An instruction processor (IP) 11 executes a program for processing data communications, business transactions, or the like. A main storage (MS) 12 stores programs, tables, and transmission/reception data. An operator console 13 is used for entering an operator command to a service processor (SVP) 14 and. for outputting a message to an operator. A load module file 4 stores execution image programs containing network definition information of the resources to be managed or controlled by the host computer. This program is loaded in MS 12 when it is executed. A load module file 5 stores execution image programs containing network definition information of the resources to be controlled by CCP. This program is transferred to CCP and executed by CCP. A directory file 6 stores definition information representative of the reconfiguration of the original network definition information, in the form of the execution image format (table format). This reconfiguration information is reflected to host computers or to a program running on CCP, in a manner to be described later.

Information offline recorded on such as a magnetic tape 10 in a manner to be described later is loaded in each of the load module files 4 and 5, and the directory file 6. A history information file 7 stores the name of a reconfiguration directory file executed by a reconfiguration command to be described later. This history information file 7 is used to automatically reflect definition information representative of the reconfiguration of the original network definition information, when a host computer or CCP restarts. I/O control processors (IOP) 15-1 and 15-2 are connected to CCP 2 or files 4 to 7 and 10 via channels 3 for data transfer therebetween.

Figure 4:
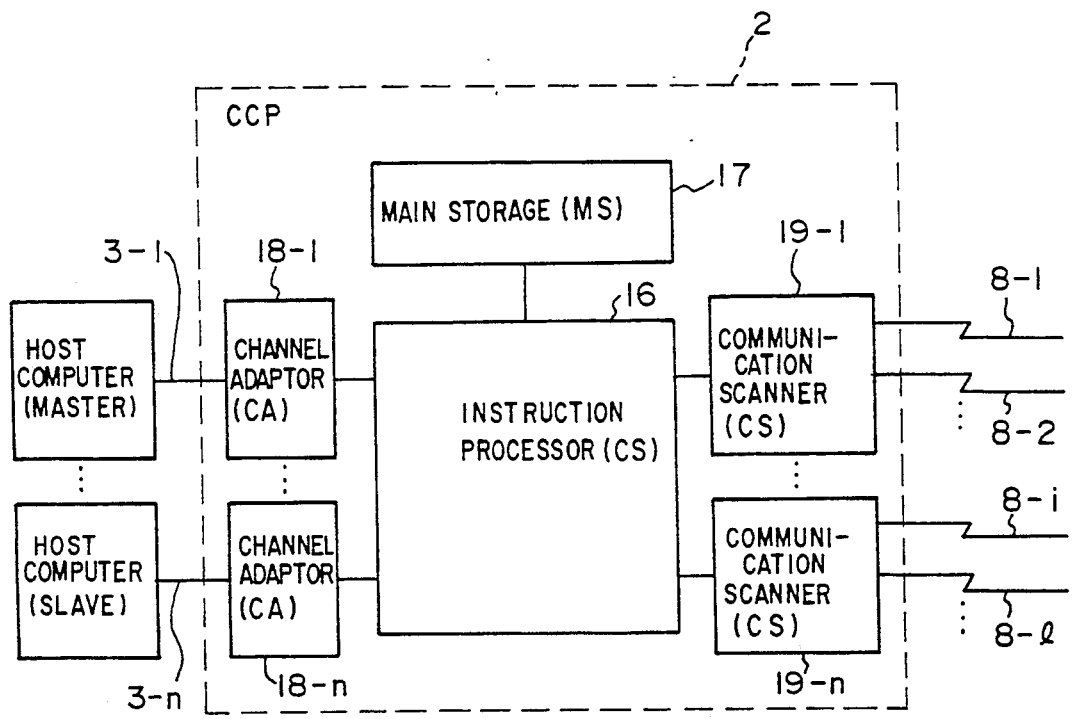
FIG. 4 shows the hardware structure of a CCP.

FIG. 4 shows the hardware structure of CCP 2. An instruction processor (IP) 16 executes a CCP program for processing data communications. A main storage (MS) 17 stores programs, tables, and transmission/reception data. Channel adaptors 18-l to 18-n connectable to host computers via channels 3-l to 3-n control the data transfer to and from host computers. Communication scanners (CS) 19-l to 19-n control scanning a plurality of lines and transmitting/receiving data to and from the lines.

In this embodiment, the start operation such as CCP program loading is assumed to be allowed only by a master host computer. The attributes (master/slave) of host computers are designated, for example, by network configuration definition information at the time of system configuration. When a host computer having a master attributes is in trouble, a host computer having had a slave attribute is changed to a new host computer having a master attribute by entering an OWN command from the operator console of this host computer.

Figure 5:
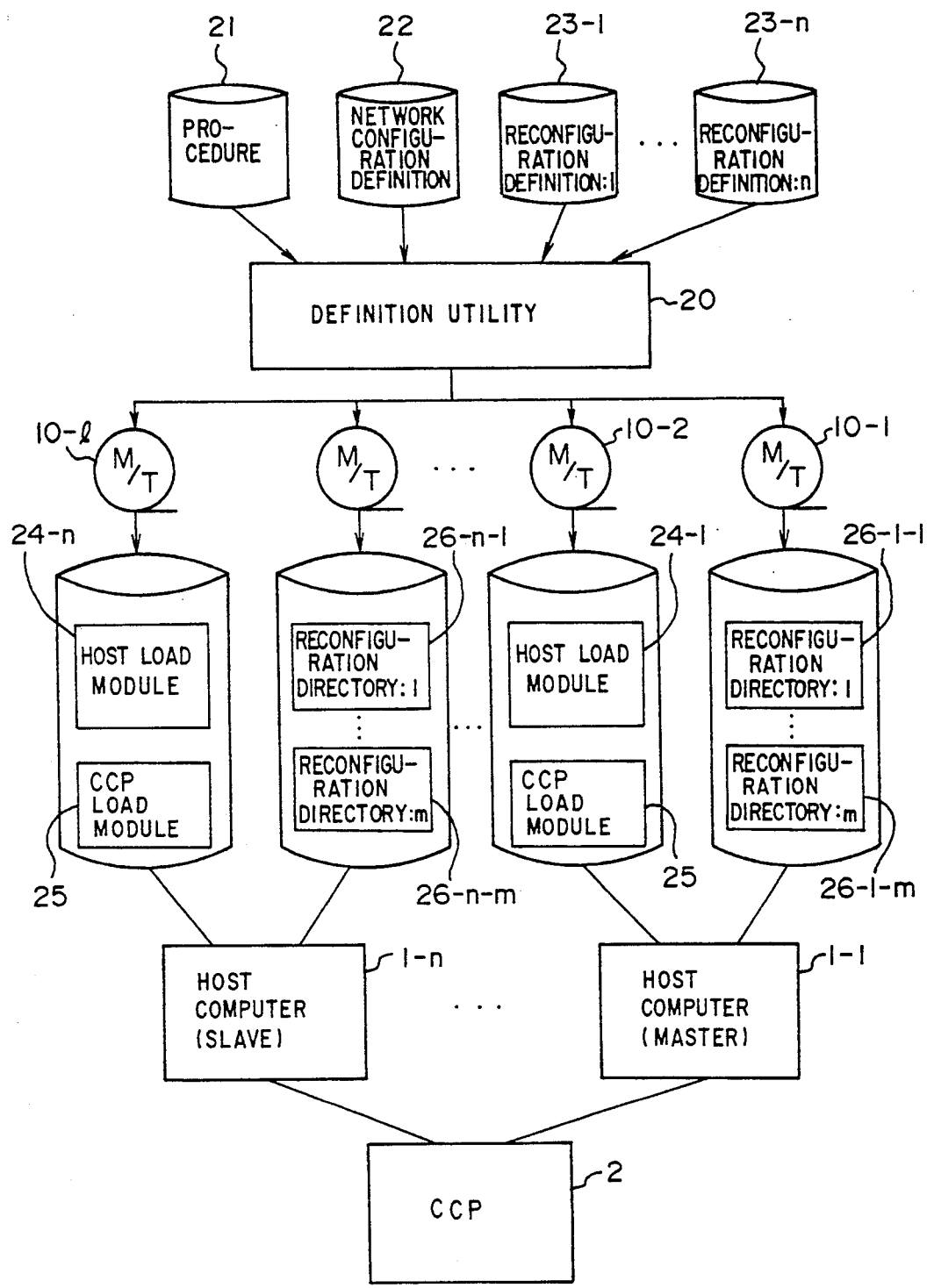
FIG. 5 is a diagram used for explaining a method of forming a load module and a reconfiguration directory.

FIG. 5 shows an example of a method of forming an execution image program.

Network configuration definition 22 represents the configuration information of the whole network to be managed, the information being described in conformity with predetermined syntax rules. A set of configuration definitions is prepared for the whole network system to be managed. Procedure 21 is a module group used for executing a program. Definition utility 20 is operated offline to take out network definition information of the resources to be managed or controlled by each host computer or CCP. The taken-out information is converted into a table format, to form an execution image program by linking a necessary procedure to the taken-out information. These programs constitute host computer load modules 24-l to 24-n and a CCP load module 25.

Each of the host computer load modules 24-l to 24-n is stored in the load module file 4 (FIG. 2) of the corresponding host computer. The CCP load module 25 is stored in the CCP load module files 5 (FIG. 2) of all host computers connected to CCP. This is because any one of host computers connected to CCP which becomes a master is allowed to start operating upon loading a program to CCP. The host computer load module and CCP load module are formed offline, for example, by one host computer, and inputted to the files of other host computers.

Figure 1:
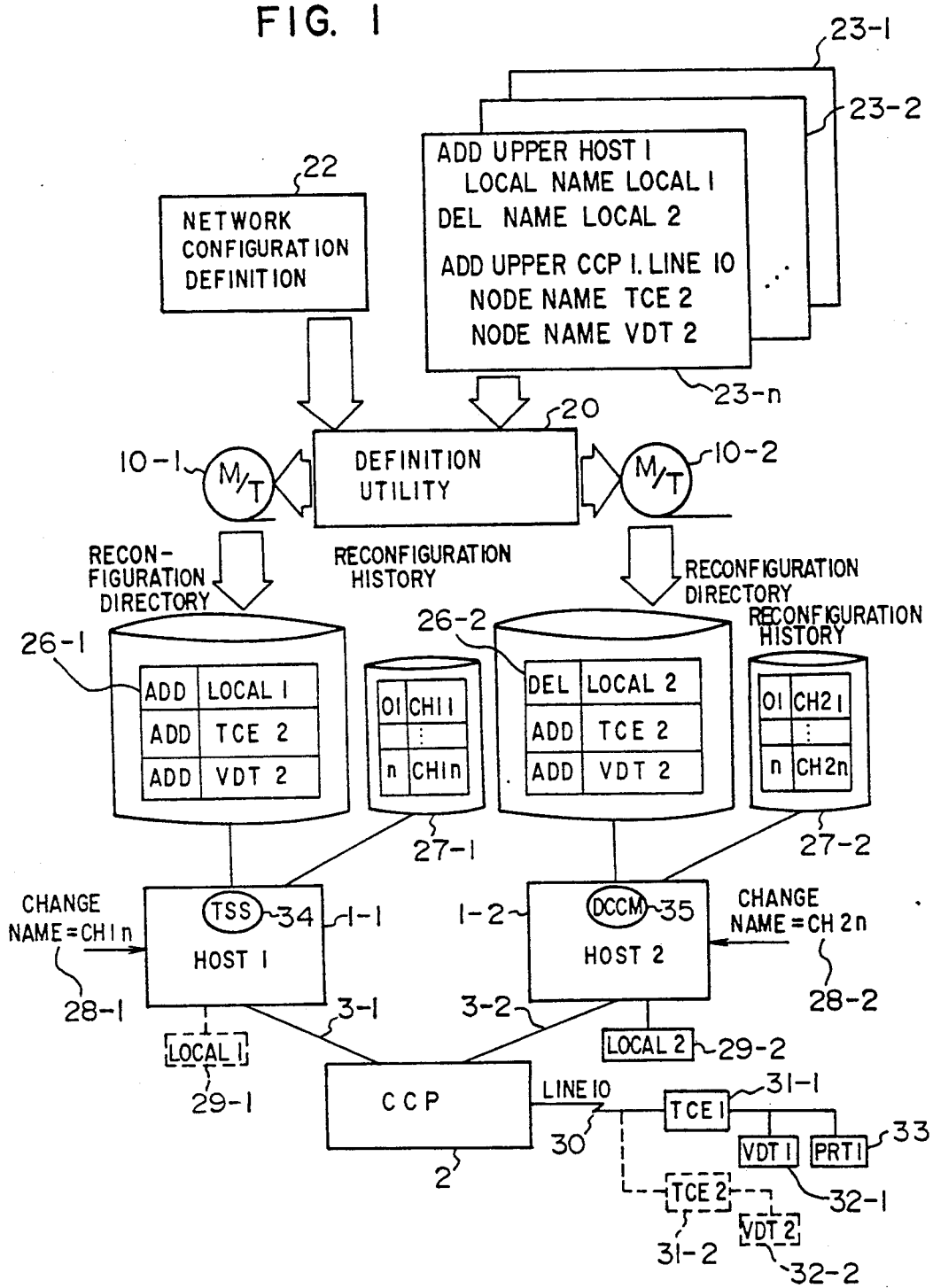
FIG. 1 is a diagram used for explaining a dynamic network reconfiguration method according to the present invention.

For example, in a network system shown in FIG. 1, two host computers (HOST 1, HOST 2) 1-1 and 1-2 are connected to CCP 2. HOST 2 is connected to a local terminal (terminal LOCAL 2 directly connected to HOST 2) 29-2, and CCP 2 is connected via a line (LINE) 30 to a terminal control equipment (TCE 1), and to a video terminal (VDT 1) 32-1 and a printer (PRT 1) 33. An application program (TSS) 34 runs on HOST 1, and another application program (DCCM) 35 runs on HOST 2.

Figure 6:
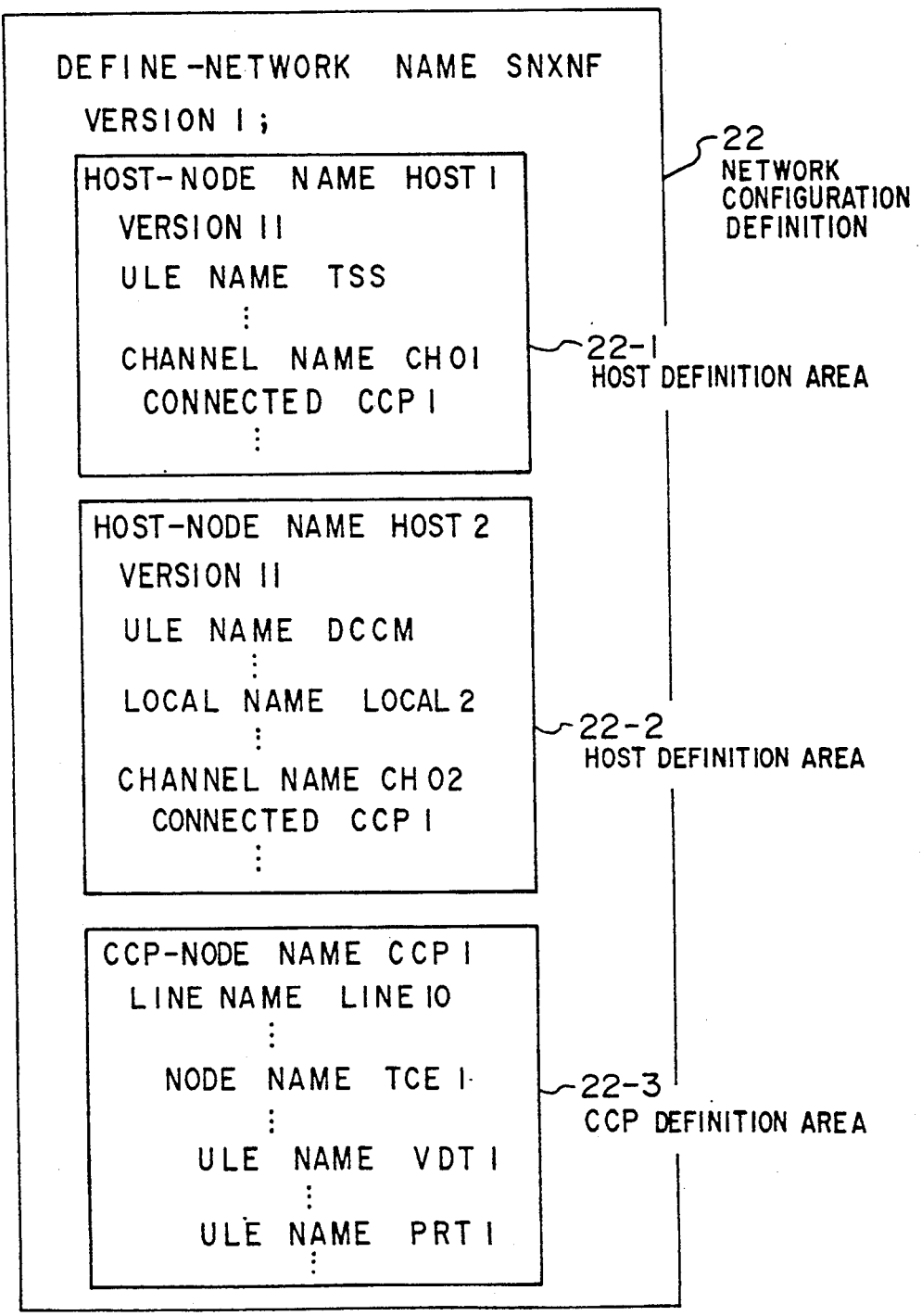
FIG. 6 shows an example of network configuration definition for the network configuration shown in FIG. 1.

FIG. 6 shows an example of the configuration definition 22 corresponding to the network shown in FIG. 1. The network configuration definition 22 is constituted by host computer definition areas 22-1 and 22-2, and a CCP definition area 22-3. At each definition area, the hierarchical relation between resources to be connected is defined.

Figure 7:
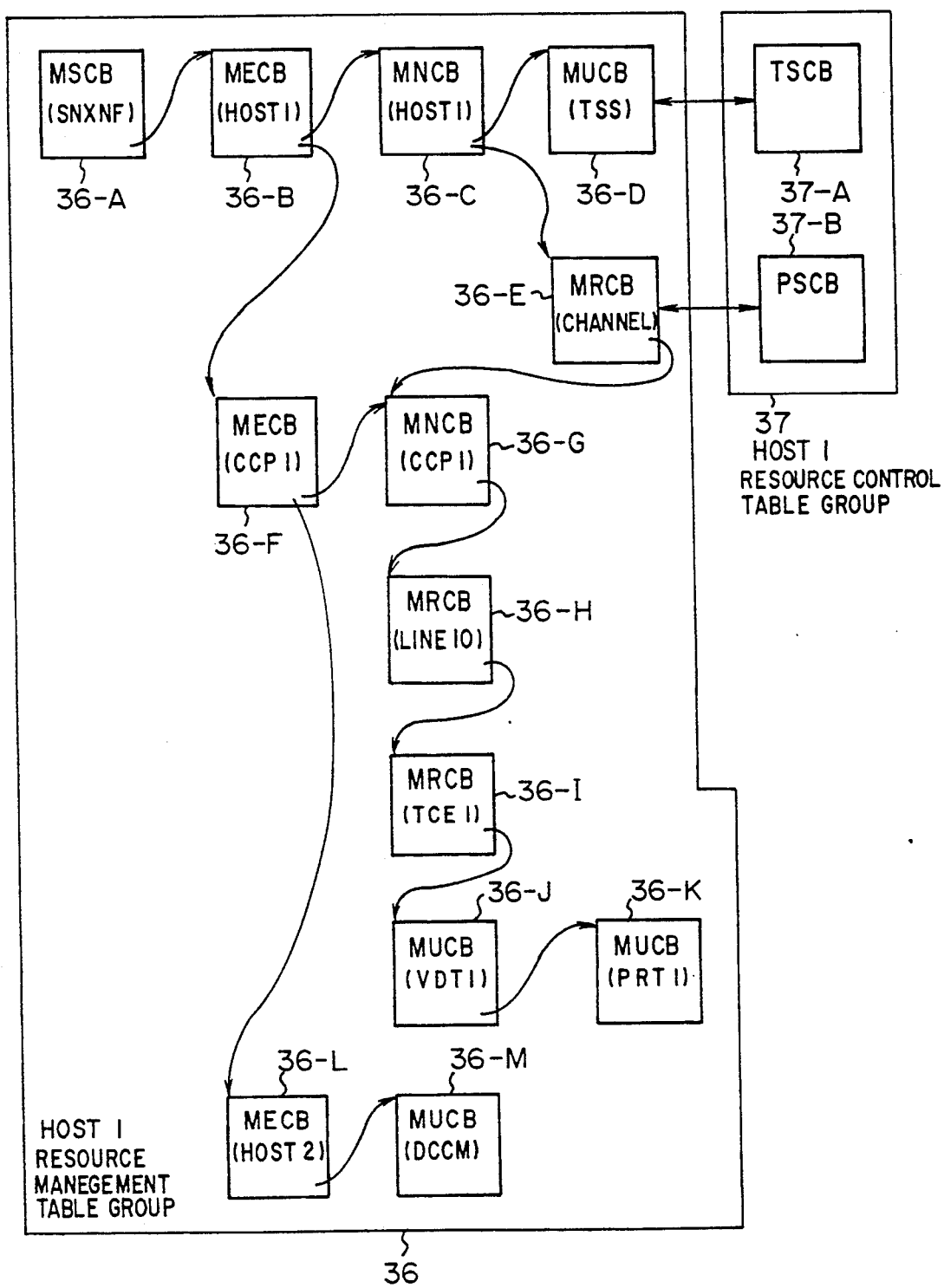
FIG. 7 shows a table group for HOST 1 generated from the network definition shown in FIG. 6.
Figure 8:
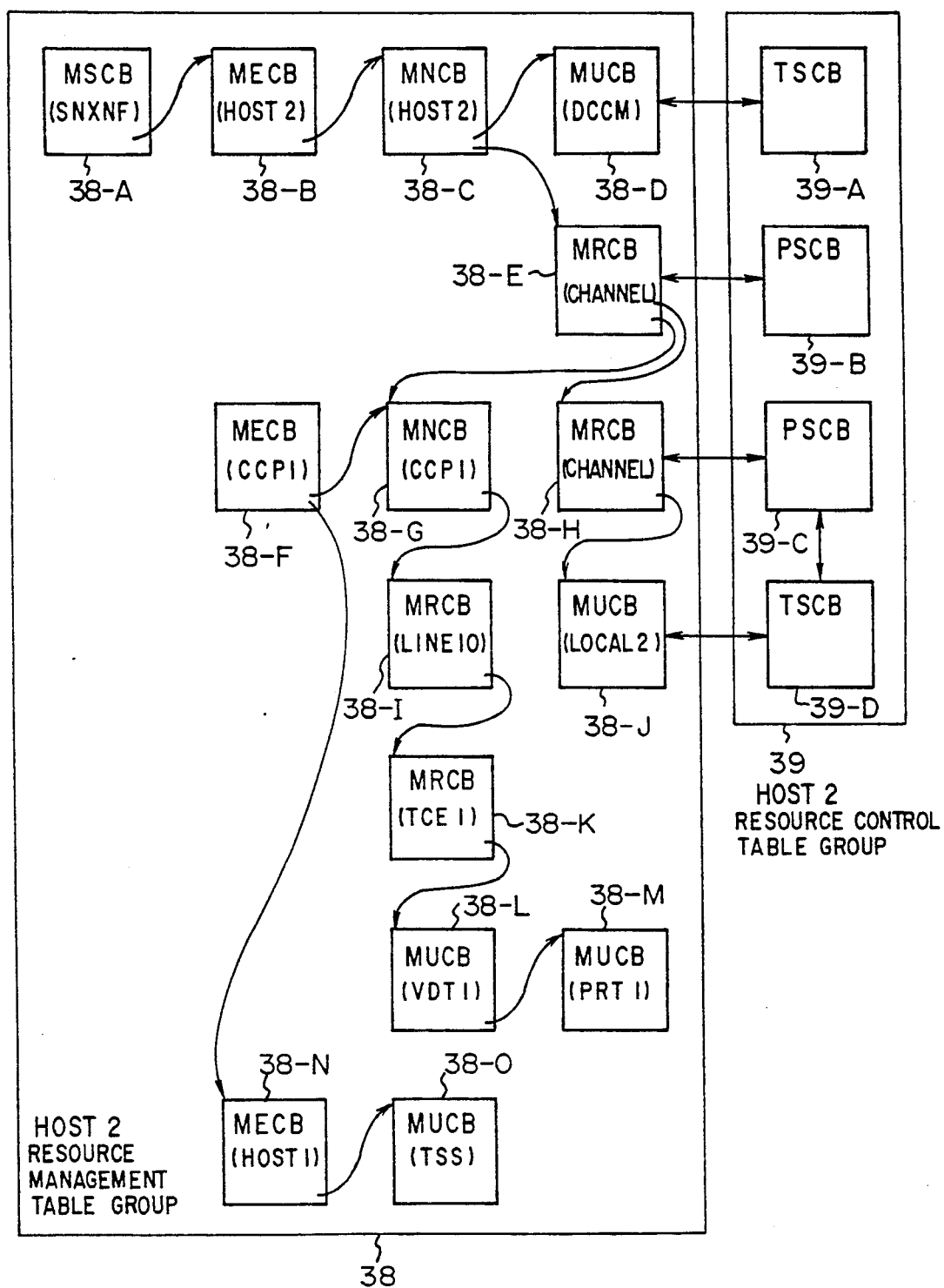
FIG. 8 shows a table group for HOST 2 generated from the network definition shown in FIG. 6.

As shown in FIGS. 7 and 8, the definition utility 20 forms resource management table groups 36 and 38 and resource control table groups 37 and 39 in correspondence with each host computer (HOST 1, HOST 2). The resource management table group is used for retrieving resources, and the resource control table group is used for the input/output control of resources. The definition utility 20 also forms a resource control table group 40 in correspondence with CCP, as shown in FIG. 9.

FIG. 7 illustratively shows a table group formed for HOST 1, and FIG. 8 illustratively shows a table group formed for HOST 2. The resource management table group 36 (38) is used when the name of a network resource to be used by an operator at the operator console 13 (FIG. 3) or by an operator at the terminal 32 (FIG. 1) connected via a communication line, is changed into an address used by the system. The resource management table group has a plurality of tables for a network to be managed, with a table (MSCB) 36-A (38-A) being positioned at the highest hierarchical level. The resource management table group indicates the hierarchical relation between a plurality of resources to be managed by the host computer, and the relations between resources at the same hierarchical levels, similarly to the network definition. The resources to be managed by the host computer include various resources 36-B to 36-M, such as resources connected to the host computer, resources connected to CCP to which the host computer is to be connected, and resources connected to another host computer likely to be communicated therewith. The resource control table group 37 (39) is formed for the resources to and from which data is actually transferred by the host computer, and indicates the relation between such resources, similarly to the resource management table 36 (38). Resources are related to each other between the resource control table group 36 (38) and resource management table group 37 (39).

Figure 9:
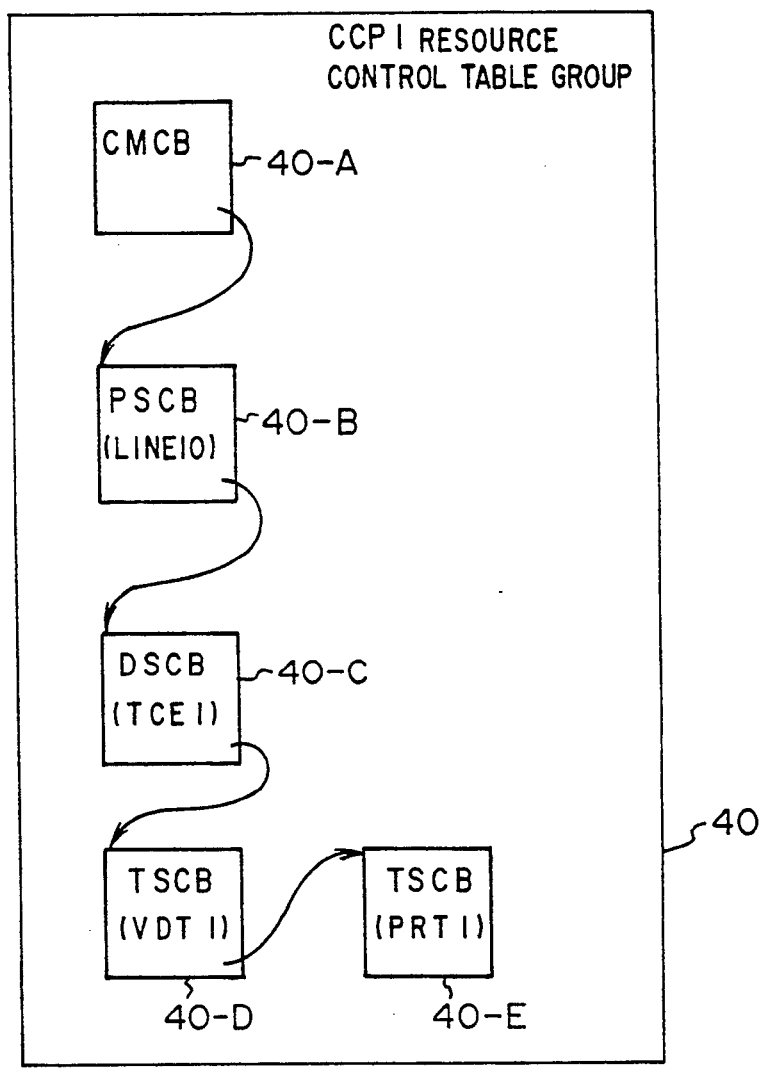
FIG. 9 shows a table group for CCP generated from the network definition shown in FIG. 6.

FIG. 9 shows an example of a resource management table group formed for CCP. Similarly to the network definition, the CCP resource control table group 40 indicates the hierarchical relation between resources, with a main table (CMCB) 40-A being positioned at the highest hierarchical level, and the relations between resources at the same hierarchical levels.

METHOD OF EXECUTING RECONFIGURATION

If it becomes necessary to reconfigure the network configuration information designated by the above-described network definition, such a reconfiguration is described as a reconfiguration definition 23-n shown in FIG. 1.

By using the network configuration definition 22, previous reconfiguration definitions 23-1 to 23-(n-1), and new reconfiguration definition 23-n, the definition utility 20 forms a reconfiguration directory in a table format for each host computer relative to resources to be changed. If a resource connected to CCP is to be changed, a reconfiguration directory 26 is formed for all host computers connected to CCP.

For example, in the network system shown in FIG. 1, the reconfiguration definition 23-n having the contents shown in FIG. 1 is formed assuming that the local terminal (LOCAL 1) 29-1, terminal control equipment (TCE 2) 31-2, and video terminal (VDT 2) 32-2 are added and the local terminal (LOCAL 2) 29-2 is deleted.

Figure 10:
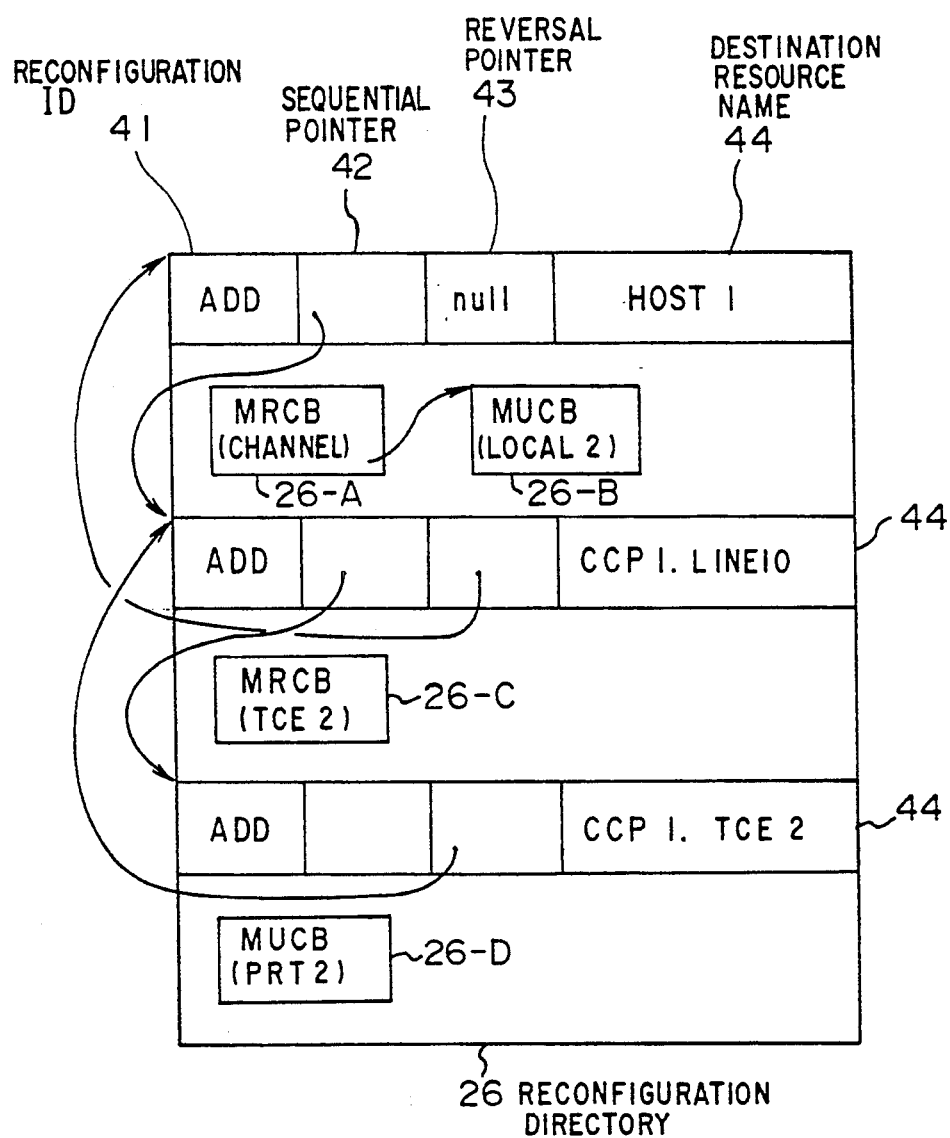
FIG. 10 shows a reconfiguration directory for HOST 1 generated from the reconfiguration definition shown in FIG. 1.
Figure 11:
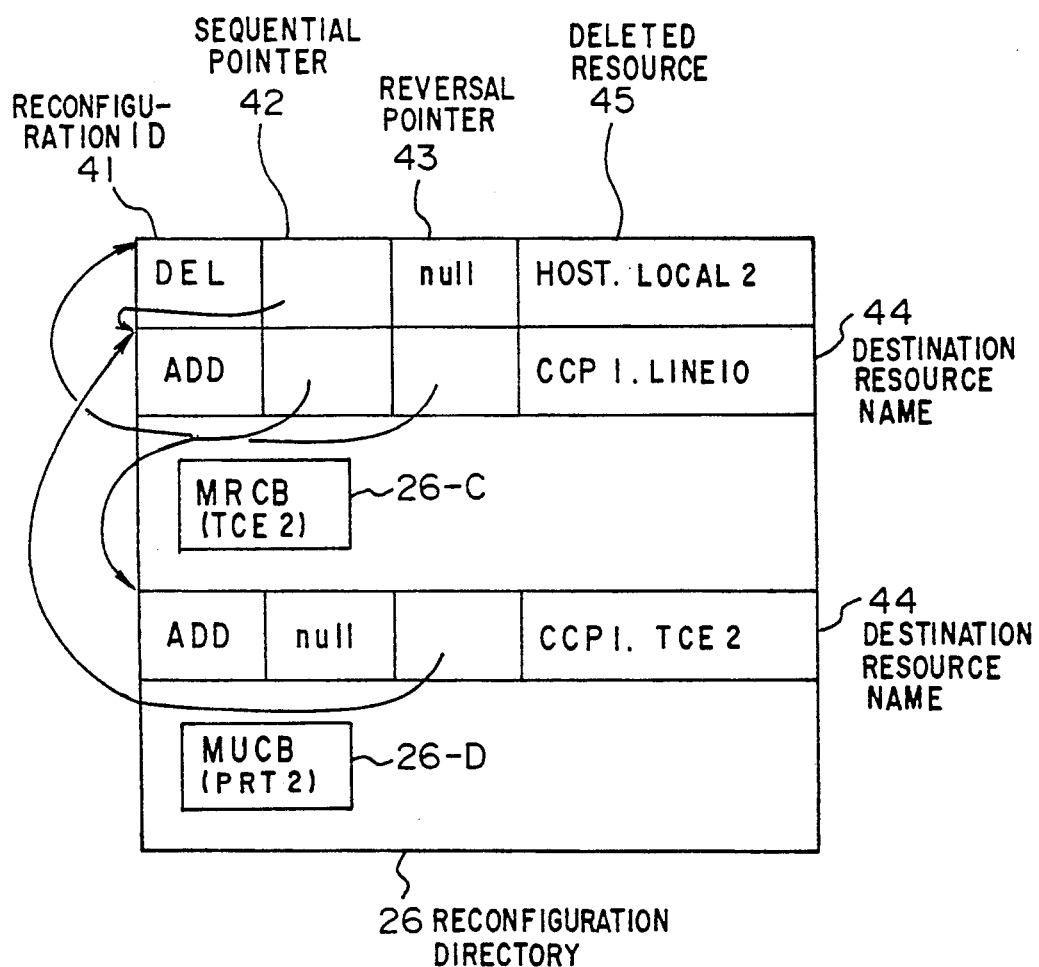
FIG. 11 shows a reconfiguration directory for HOST 2 generated from the reconfiguration definition shown in FIG. 1.
Figure 12A:
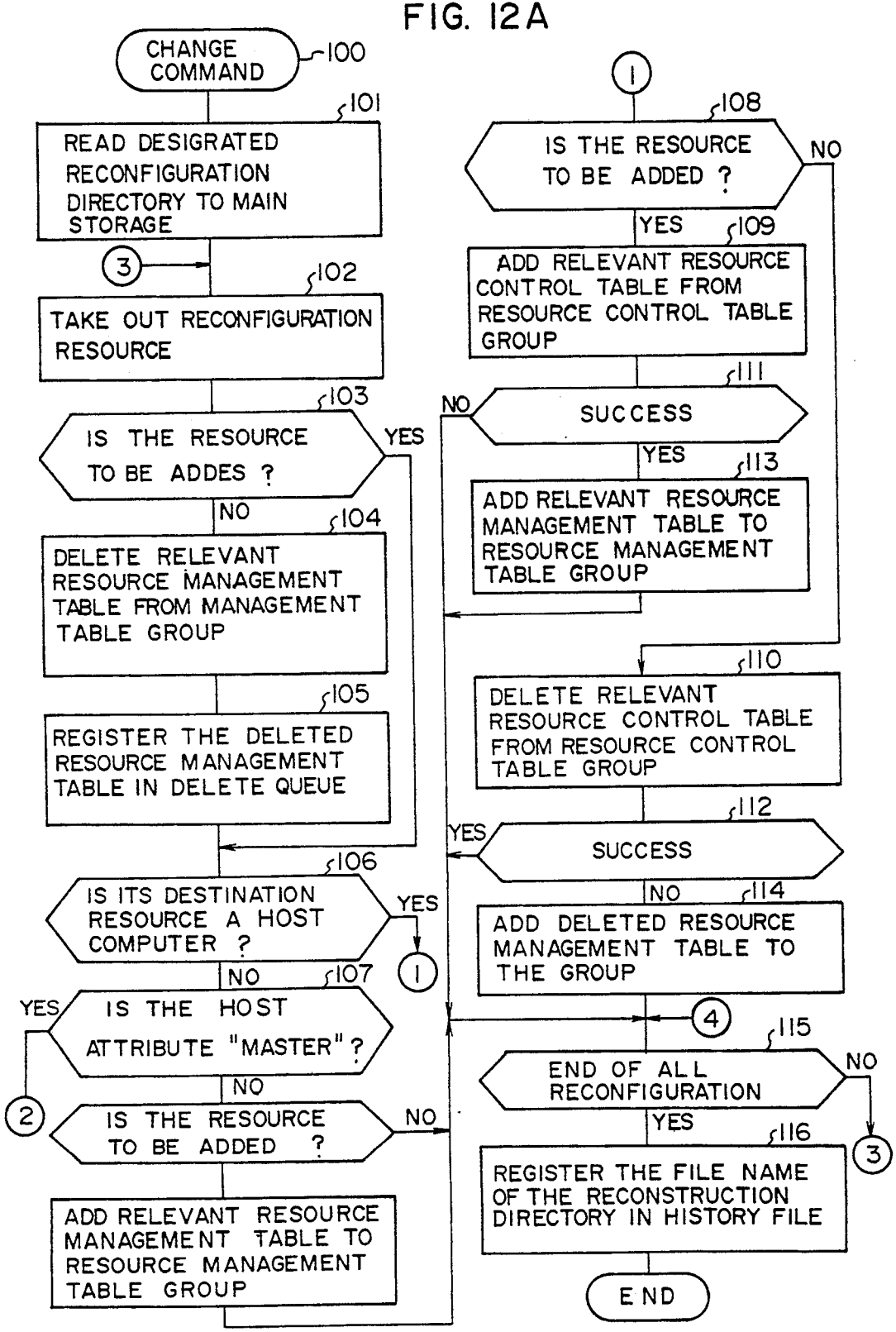
FIGS. 12A and 12B are flow charts illustrating the procedure to be executed by a host computer in response to a CHANGE command.
Figure 12B:
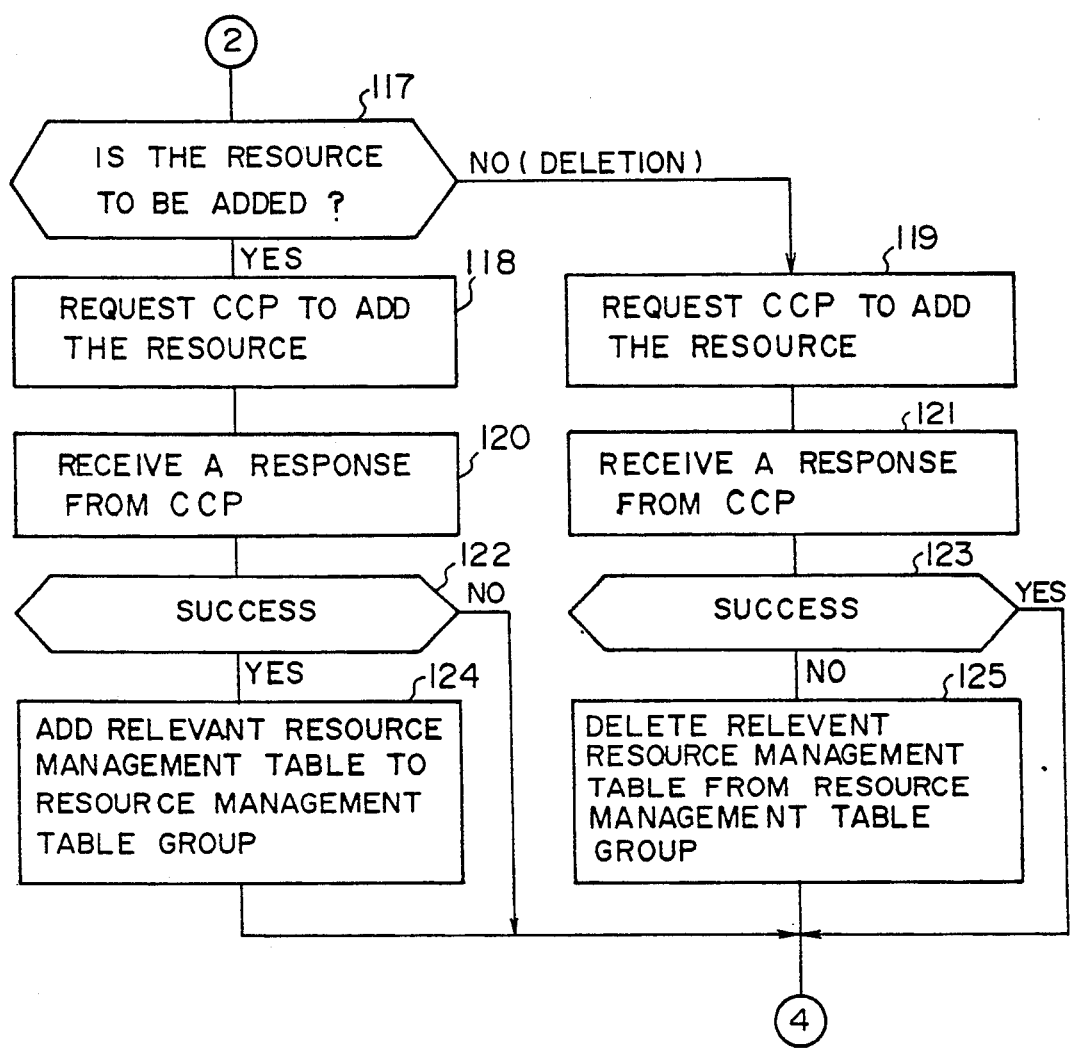

The definition utility 20 forms reconfiguration directories in the table format for HOST 1 and HOST 2 as shown in FIGS. 10 and 11, in accordance with the reconfiguration definition 23-n, the reconfiguration directories being stored in the reconfiguration directory files 6 (FIG. 2).

As shown in FIGS. 10 and 11, the reconfiguration directory 26 is constituted by resource management tables 26-A to 26-D formed for resources to be changed, and control information. The control information includes a reconfiguration identifier (ID) 41, a sequential pointer 42 for pointing the next resource management table, a. reversal pointer 43 used for canceling reconfiguration to be described later, a destination resource name 44, and a resource name 45 to be deleted in the case of resource deletion.

Next, referring to FIGS. 12A to 12D, there will be described the procedure for reflecting the contents of a reconfiguration directory to a program running on a host computer or CCP.

Commands "CHANGE" and "NAME=file name 28 of the reconfiguration directory" are entered from the operator consoles (FIG. 3) of host computers (in this case, HOST 1, and HOST 2) (step 100). Each host computer reads the contents of the reconfiguration directory designated by the file name 28 and store them in MS (step 101). Next, in accordance with the reconfiguration procedure defined by the reconfiguration directory, the following processes are executed for each resource to be changed.

If a resource is to be added (step 103) and if the resource is to be directly connected to the host computer (step 106), then the resource control table for the resource in concern is added to the resource control table group under operation (step 109). Specifically, a new table area is established and added to the resource control table corresponding to the destination resource name 44 (FIGS. 10 and 11) defined by the reconfiguration directory 26. The control information to be set to the table is read from the resource management table for the reconfiguration directory. If these processes succeed (step 111) (if the table area is not established, they fail), the resource management table 26-A to 26-D of the resource in concern within the reconfiguration directory 26 is added to the resource management table group 36, 38 in operation and related to the resource control table in operation (step 113). Namely, the resource management table 26-A to 26-D is added as the new resource management table corresponding to the destination resource name designated by the reconfiguration directory. If the resource to be added is to be connected to CCP, such as the line, terminal control equipment, video terminal, printer and the like shown in FIG. 1 (step 106), and if the host computer in concern is a master (step 107), then CCP is requested to add the resource (steps 118 to 120). If these processes succeed (step 122), the resource management table for the resource in concern is added to the resource management table group in operation (step 124). If the host computer in concern is a slave (step 107), the resource management table for the resource in concern is added to the resource management table group in operation, without requesting CCP to add the resource (step 127).

If a resource is to be deleted (step 103), the resource management table for the resource in concern is deleted from the resource management table group in operation (step 104), and the deleted resource management table is registered in a delete queue so as to deal with any failure in a delete process or a cancel process to be described later (step 105). If the resource to be deleted has been connected to a host computer (step 106), its resource control table is deleted from the resource control table group in operation (step 110). If this process fails (e.g., the resource is in use) (step 112), the resource management table for the resource is taken out from the delete queue, and again added to the resource management table group (step 114). If the resource to be deleted has been connected to CCP (step 106) and if the host computer is a master (step 107), CCP is requested to delete the resource (steps 119 to 121). If the request to CCP fails because of a CCP trouble, a use of the resource in concern, or the like (step 123), the resource management table of the deleted resource is taken out from the delete queue, and again added to the resource management table in operation (step 125).

When the above processes have been completed for all resources designated by the reconfiguration directory 26, the file name of the reconfiguration directory is registered in the reconfiguration history file 7 (step 116), to thereafter terminate the reconfiguration processing.

FIGS. 13 and 14 show examples of the formats of CCP-connected resource change requests M1 and M3 and response messages M2 and M4 transferred between host computers and CCP. Each message includes a reconfiguration identifier field 46 and a request/response field 47. An addition request message M1 further includes a destination resource name 48, and control information 49 in an addition table. The deletion request message M3 further includes the name 51 of a resource to be deleted. The response message M2 includes a field 48 and a success/failure field 50, and the response message M4 includes a field 51 and a success/failure field 50.

Figure 15:
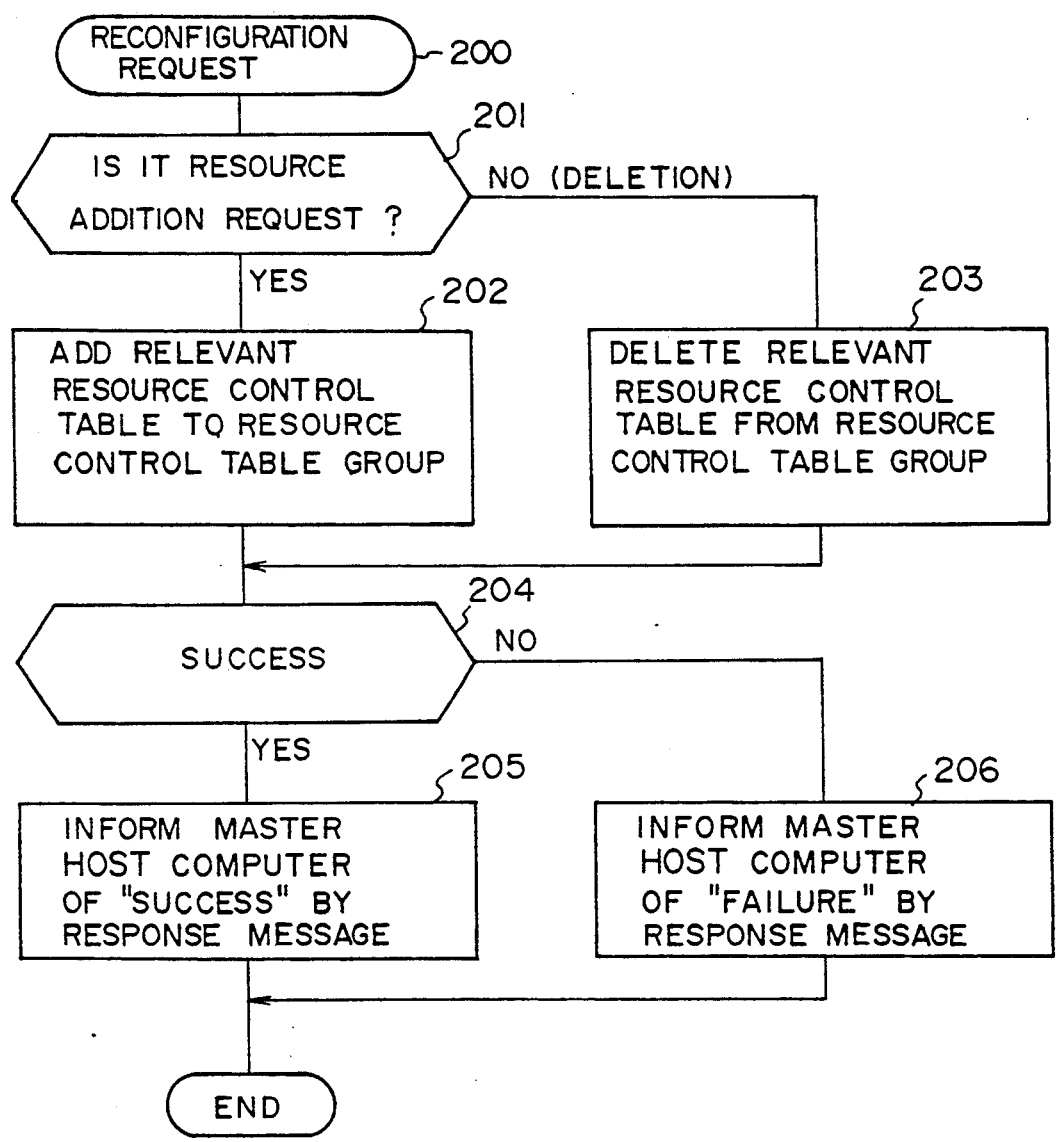
FIG. 15 is a flow chart illustrating a procedure to be executed by CCP upon reception of a resource reconstruction request.

FIG. 15 shows the procedure to be executed by CCP when a request for changing a resource is received. When CCP receives a request for adding a resource (step 201), the resource control table for the resource is added to the resource control table group 40 in operation (step 202). In this case, the resource control table is added as the resource control table corresponding to the destination resource name 48 of the resource addition request message (FIG. 13). If a resource deletion request is received, the resource control table corresponding to the name 51 of a resource to be deleted within the resource deletion request message (FIG. 14), is deleted from the resource control table group 40 in operation (step 203). Thereafter, the results of addition/deletion processes, i.e., the change response, is sent to the host computer (steps 204 to 206).

Figure 16:
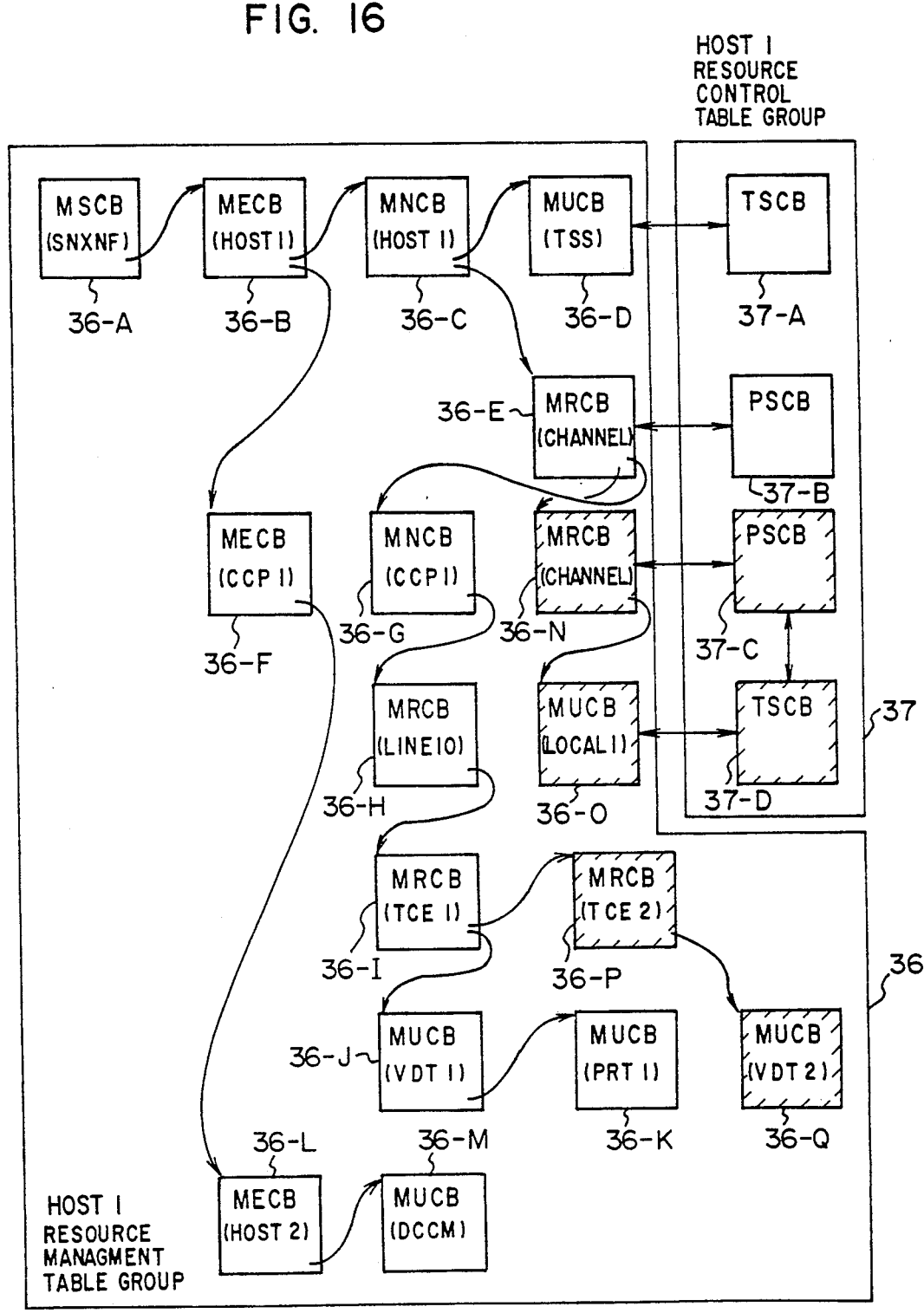
FIG. 16 shows a table group for HOST 1 generated upon input of a reconfiguration command.
Figure 17:
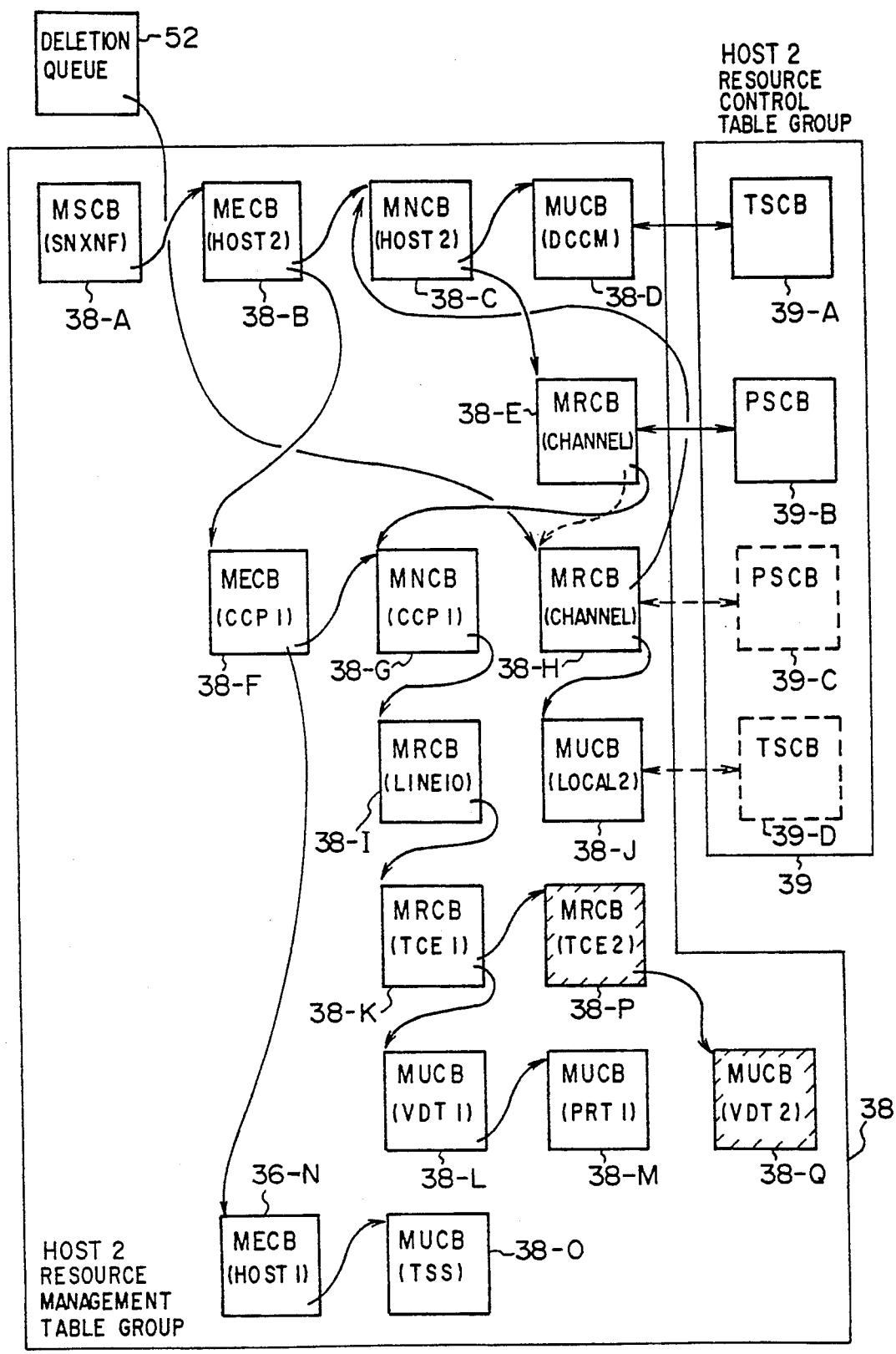
FIG. 17 shows a table group for HOST 2 generated upon input of a reconfiguration command.

FIGS. 16 and 17 are a resource management table group and a resource control table group respectively of HOST 1 and HOST 2, showing the resource change shown in FIG. 1. FIG. 16 shows that resources LOCAL 1 (36-N, 36-O, 37-C, 37-D), TCE 2 (36-P), and VDT 2 (36-Q) are newly added. FIG. 17 shows that resources TCE 2 (38-P), and VDT 2 (38-Q) are newly added and resources LOCAL 2 (38-H, 38-J, 39-C, 39-D) are deleted. In order to realize a resource cancel process to be described later, a deleted resource management table is registered in a delete queue 52, and in order to register a destination resource, it is related to the resource management table group.

Figure 18:
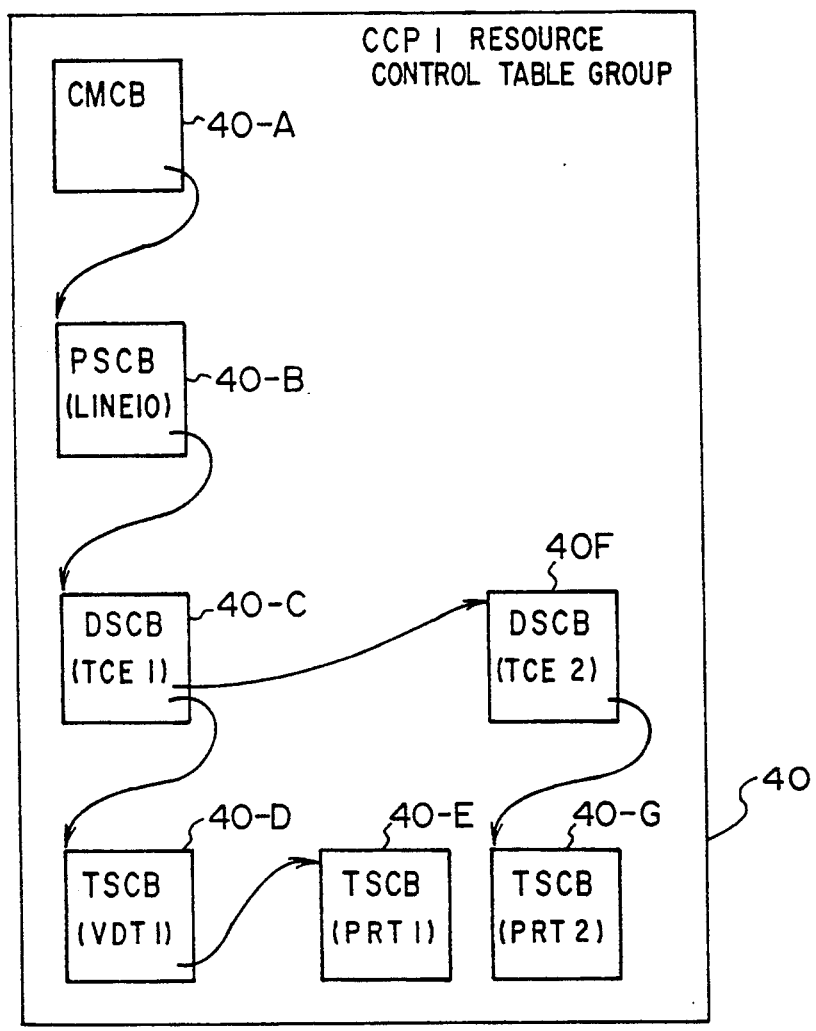
FIG. 18 shows a table group for CCP generated upon input of a reconfiguration command.

FIG. 18 shows a change of the resource control table for CCP. In FIG. 18, there are newly added resources TCE 2 (40-F), VDT 2 (40-G).

It is preferable to physically add a resource before the network configuration definition information is changed, and physically delete a resource after the network configuration definition information has been changed.

METHOD OF CANCELING RECONFIGURATION

Figure 19A:
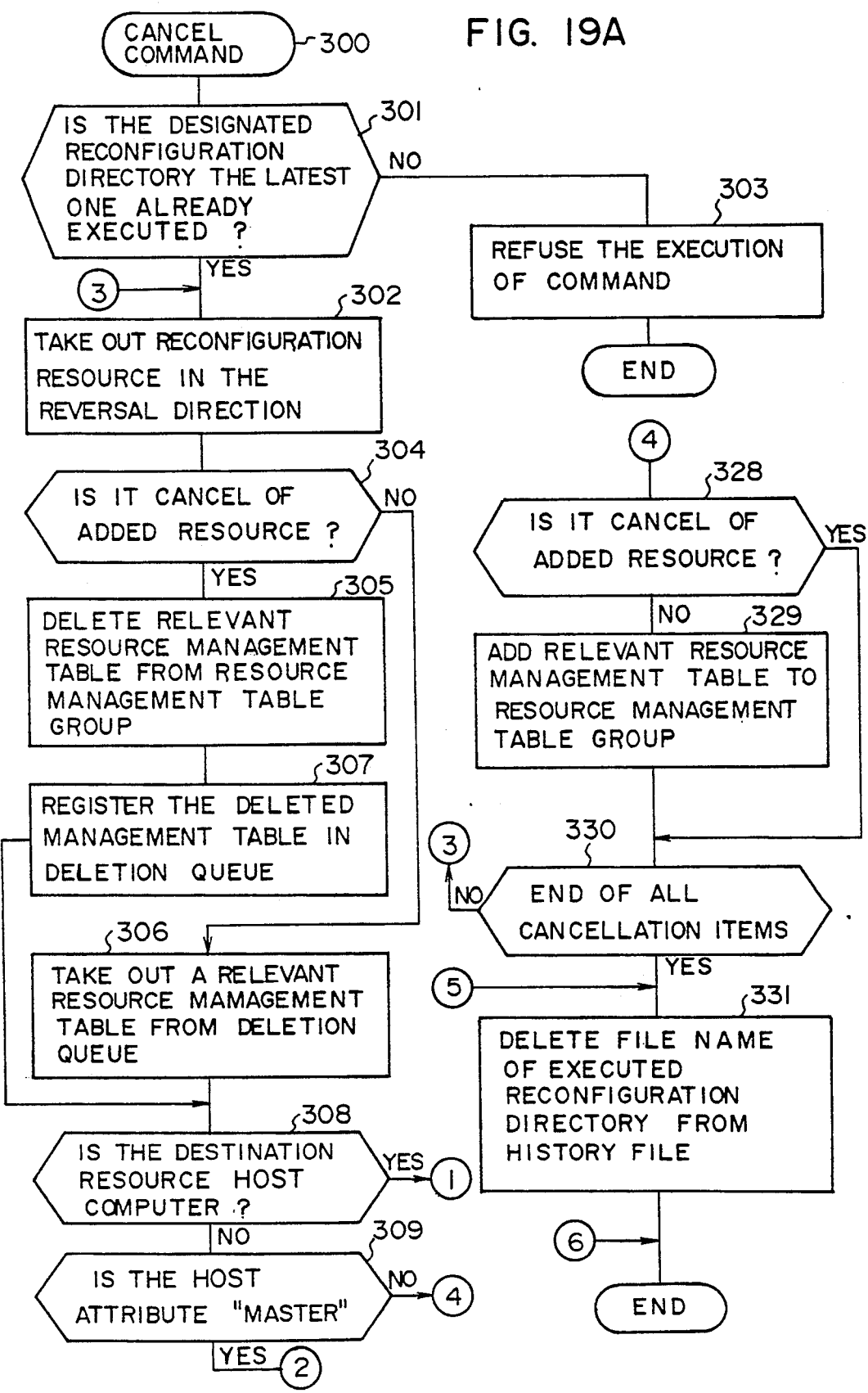
FIGS. 19A to 19C are flow charts illustrating the procedure to be executed by a host computer in response to a CANCEL command.
Figure 19B:
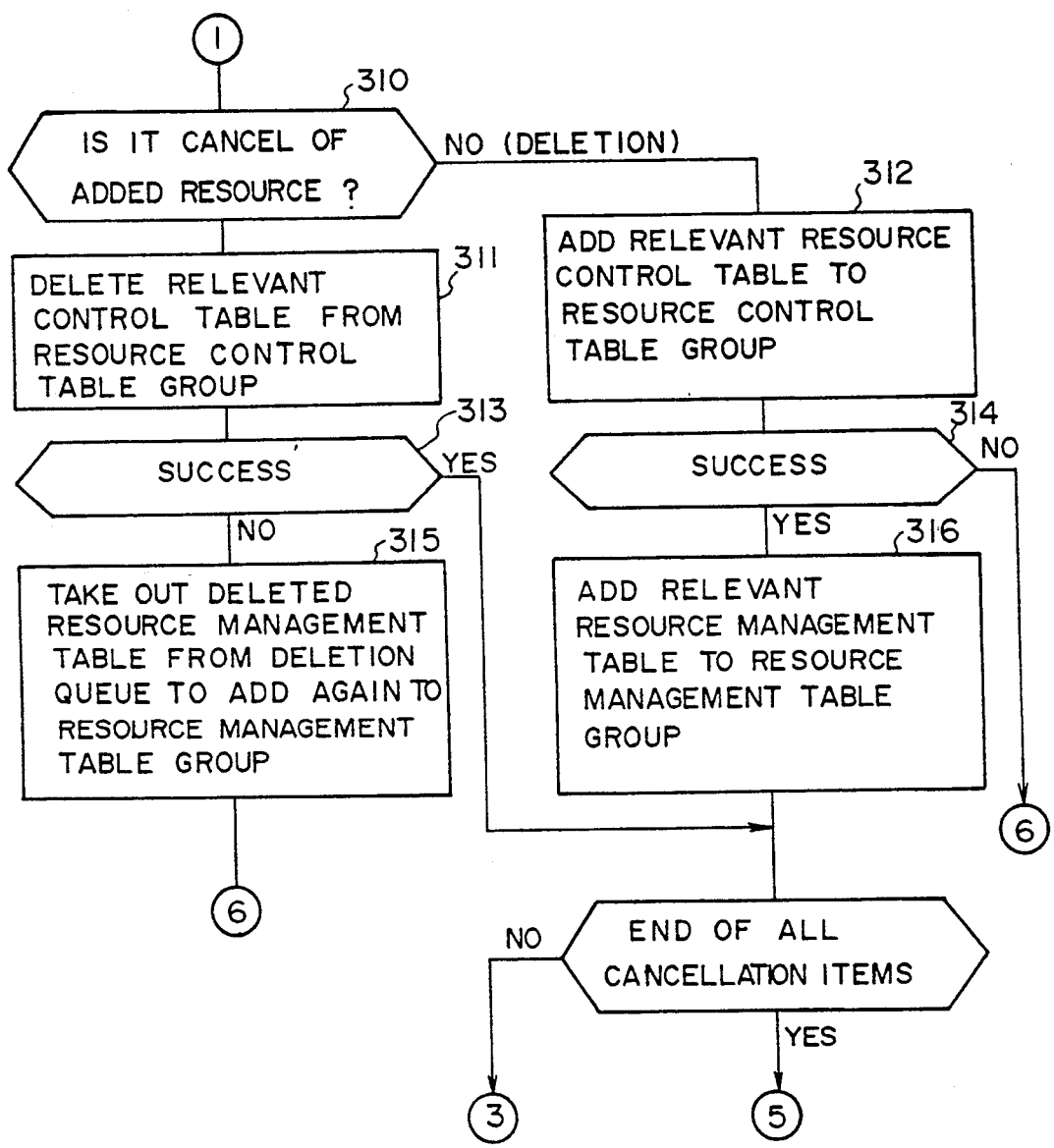
Figure 19C:
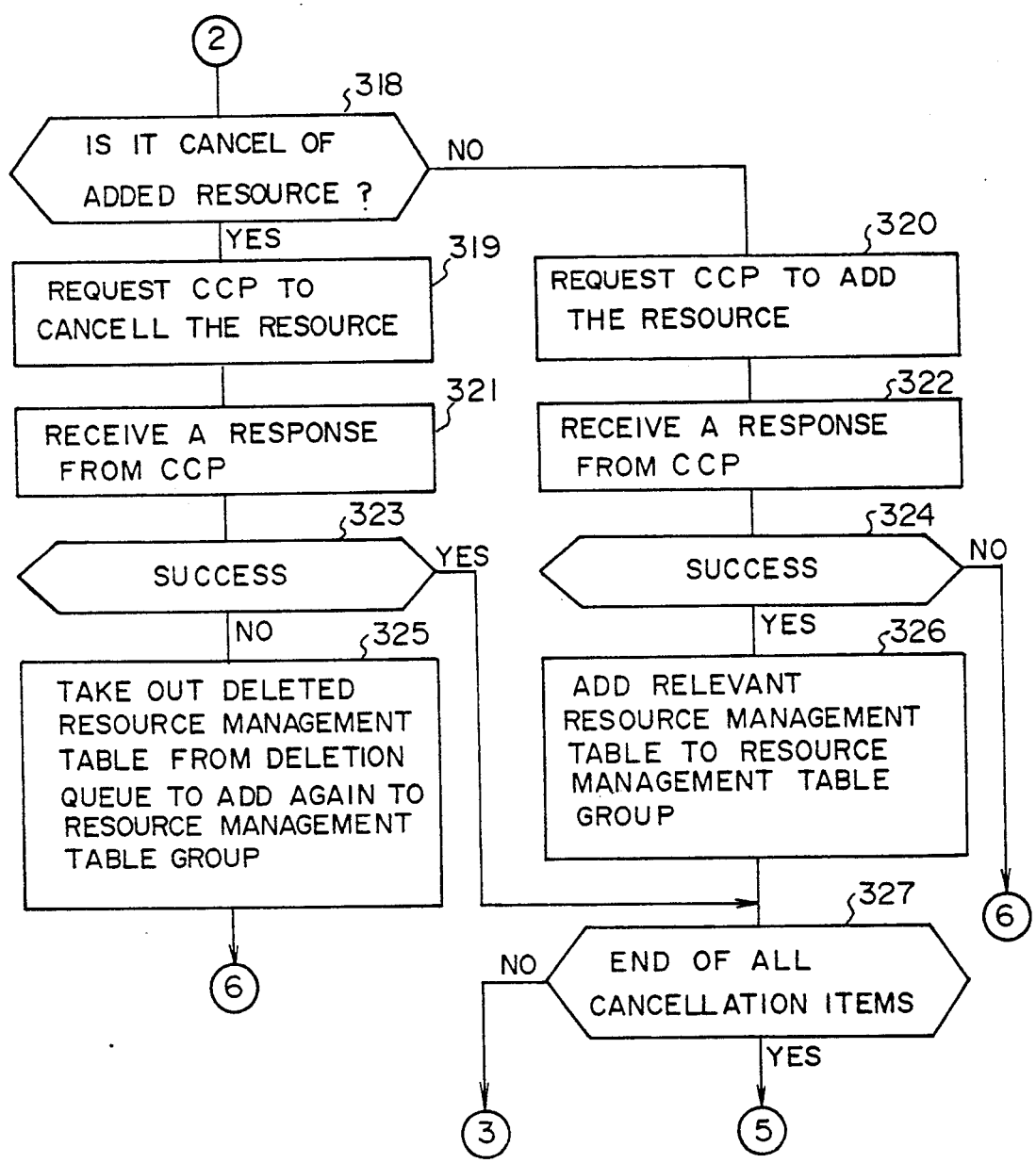

If the logical reconfiguration executed by the above-described procedure is not consistent with the actual physical configuration, because of, for example, erroneous definition, it becomes necessary to cancel the reconfiguration once executed, form a correct reconfiguration definition, and again execute it. The procedure of canceling a logical reconfiguration once executed will be described with reference to FIGS. 19A to 19C.

Commands "CANCEL" and "NAME=file name 28 of the reconfiguration directory" are entered from the operator consoles (FIG. 3)of host computers (in this case, HOST 1, and HOST 2) (step 300). It is checked if the reconfiguration directory designated by the command is the latest one already executed among the already executed reconfiguration directories (23-*l* to 23-*n* in FIG. 1) (step 301). If not the latest one (directory last executed), the commands is refused to be executed (step 303). The reason for refusing to cancel a reconfiguration directory other than the last executed one 23-*n* is to prevent any contradiction between network configuration definitions.

The following processes are executed by sequentially taking out reconstruction directories of respective resources stored in MS, starting from the latest reconstruction directory 23-*n*, in the reverse direction of loading reconstruction directories at the time of executing the CHANGE command. The reason why the order of changing resources is reversed between executing a CANCEL command and executing a CHANGE command is to prevent any contradiction between network configuration definitions.

If the taken-out resource is an added resource, i.e., if the added resource is to be canceled (step 304), the resource management table 36-*i* of the resource in concern is deleted from the resource management table group 36, 38, or 40 in operation (step 305). The deleted resource management table 36-*i* is registered in the delete queue 52 so that the table 36-*i* once deleted can be again added in the case of a failure in deleting the resource control table 37-*i* corresponding to the resource in concern (step 307). It is then checked if the deleted resource was connected to the host computer (step 308). If it was connected to the host computer, the resource control table 37-*i* of the resource in concern is deleted from the resource control table group 37 or 39 in operation (step 311). If this process fails (step 313), the resource management table 36-*i* once deleted is taken out from the delete queue 52, and again added to the resource management table group 36 or 38 (step 315). If the deleted resource was connected to CCP (step 308), it is checked if the host computer is a master or a slave (step 309). If it is a master host computer, a deletion request for the resource is issued to CCP (step 319) and waits for a response from CCP (step 321). In the case of a failure in deleting the resource at CCP, the resource management table 3-*i* of the resource is taken out from the delete queue 52, and again added to the resource management table group (steps 323 and 325).

On the other hand, if the resource taken out from the reconfiguration directory 23-n is a deleted resource, in other words, if the resource is not to be deleted (step 304), the resource management table 36-j of the resource in concern is taken out from the delete queue 52 (step 306). It is then checked if the resource was connected to the host computer (step 308). If so, in accordance with the control information in the resource management table 36-j taken out from the delete queue, the resource control table 37-j of the resource in concern is added to the resource control table group 36 or 38 in operation (step 312). If this process succeeds (step 313), the resource management table 36-j is added to the resource management table group 36 or 38 in operation (step 316).

If the deleted resource was connected to CCP (step 308), it is checked if the host computer is a master or not (step 309). If it is a master, a request for adding the resource is issued to CCP (steps 320 to 322). If this process succeeds, the resource management table 36-j is added to the resource management table group 36 or 38 (step 316). If the host computer is a slave, the resource management table 36-j is merely added to the resource management table group 36 or 38 (step 316).

When the above procedure is repeated and completed for all resources in the reconfiguration directories to be canceled, the file names of the reconfiguration directories are deleted from the reconfiguration history files (7 and 27). Also in the cancel process, a control table for CCP is added or deleted by the procedure shown in FIG. 15. The table groups shown in FIGS. 16, 17, and 18 can restore the state before the reconfiguration shown in FIGS. 7, 8, and 9, by the above procedure.

METHOD OF AUTOMATIC RECONFIGURATION AT SYSTEM RESTART

According to the present invention, an operator is not required to enter again complicated CHANGE commands in restarting the operation of a host computer or CCP. To this end, the reconfiguration directory file names are stored in the reconfiguration history file 7 (FIG. 2) each time a CHANGE command is executed. Referring to the directory file names, the reconfiguration previously executed is automatically executed again at the time of restarting the system operation. The procedure of automatic reconfiguration at the time of system restarting will be described within reference to FIGS. 20 and 21A to 21C.

Figure 20:
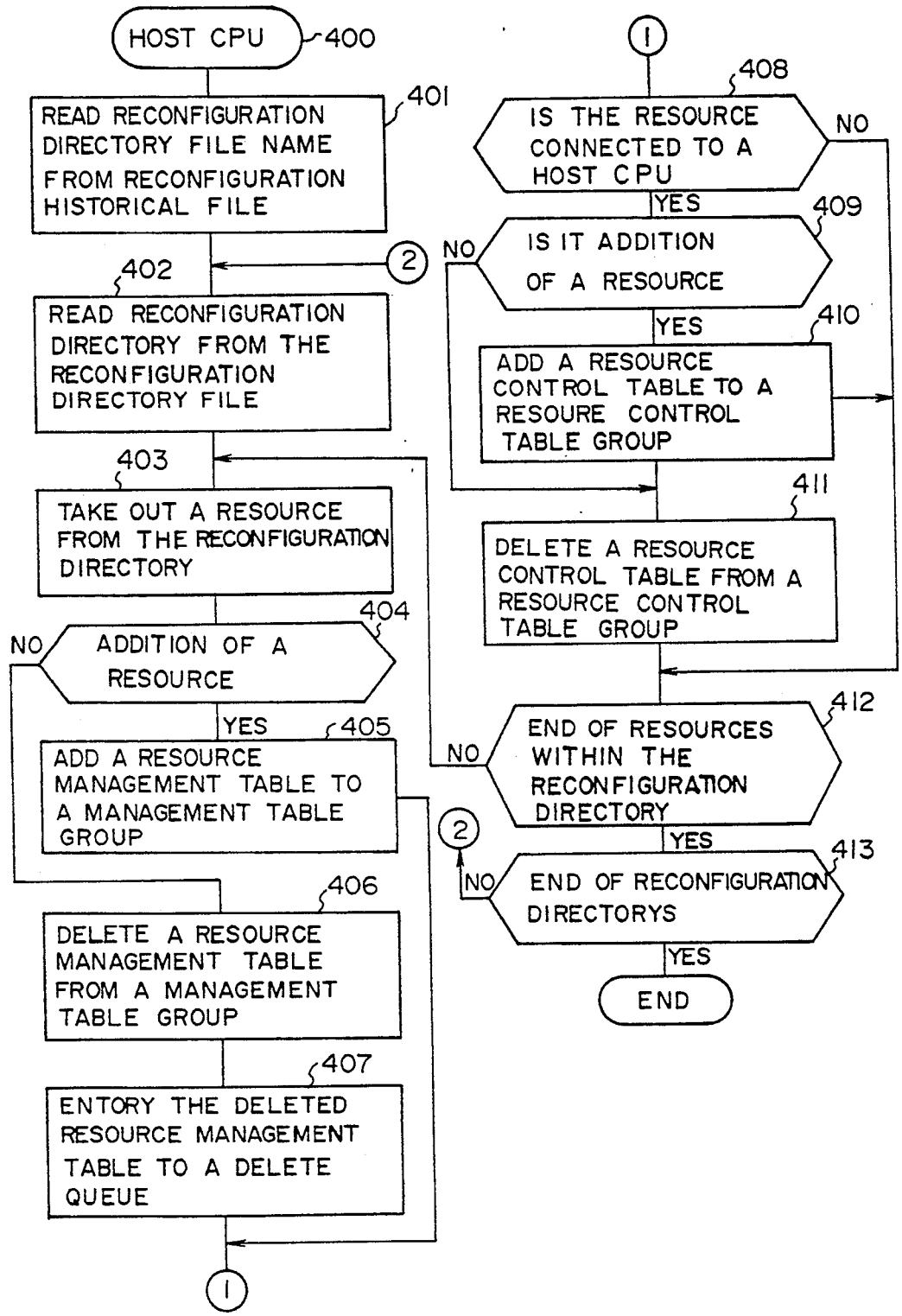
FIG. 20 is a flow chart illustrating an automatic reconfiguration procedure executed at the time of restarting the operation of a host computer.

FIG. 20 shows an automatic reconfiguration routine 400 at the time of restarting the operation of a host computer when a program is loaded. When the operation of a host computer restarts, the file names of reconfiguration directories executed previously are read from the reconfiguration file (step 401). The reconfiguration directory having a file name read from the reconfiguration file is read from the reconfiguration directory file 6 (step 402), and the following processes are executed for each resource taken out from the reconfiguration directory (step 403).

If the taken-out resource is a resource to be added (step 404), the resource management table for the resource in concern is added to the resource management table group (step 405). If the resource is to be connected to the host computer (step 408), the resource control table for the resource in concern is also added to the resource control table group (step 410). If the resource taken out from the reconfiguration directory is a resource to be deleted (step 404), the resource management table for the resource in concern is deleted from the resource management table in operation (step 406), and the deleted resource management table is registered in the delete queue (step 407). If the resource was connected to the host computer (step 408), the resource control table for the resource in concern is also deleted from the resource control table group already set (step 411). The above procedure is repeated and completed for all resources in all reconfiguration directories (steps 412 and 413), the routine 400 is terminated.

Figure 21A:
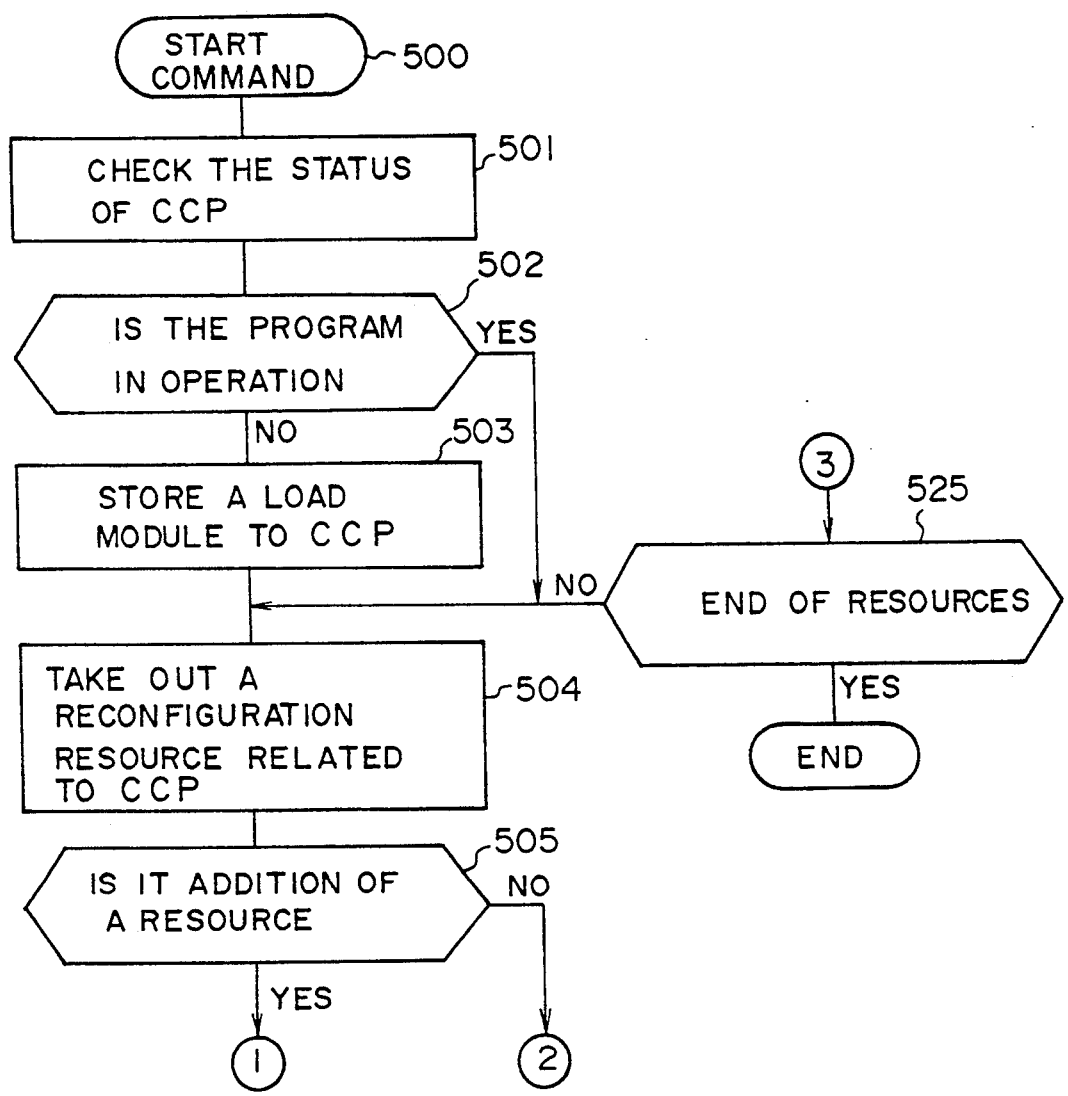
FIGS. 21A to 21C are flow charts illustrating an automatic reconfiguration procedure to be executed by a master host computer in response to a START command at the time of restarting the operation of CCP.
Figure 21B:
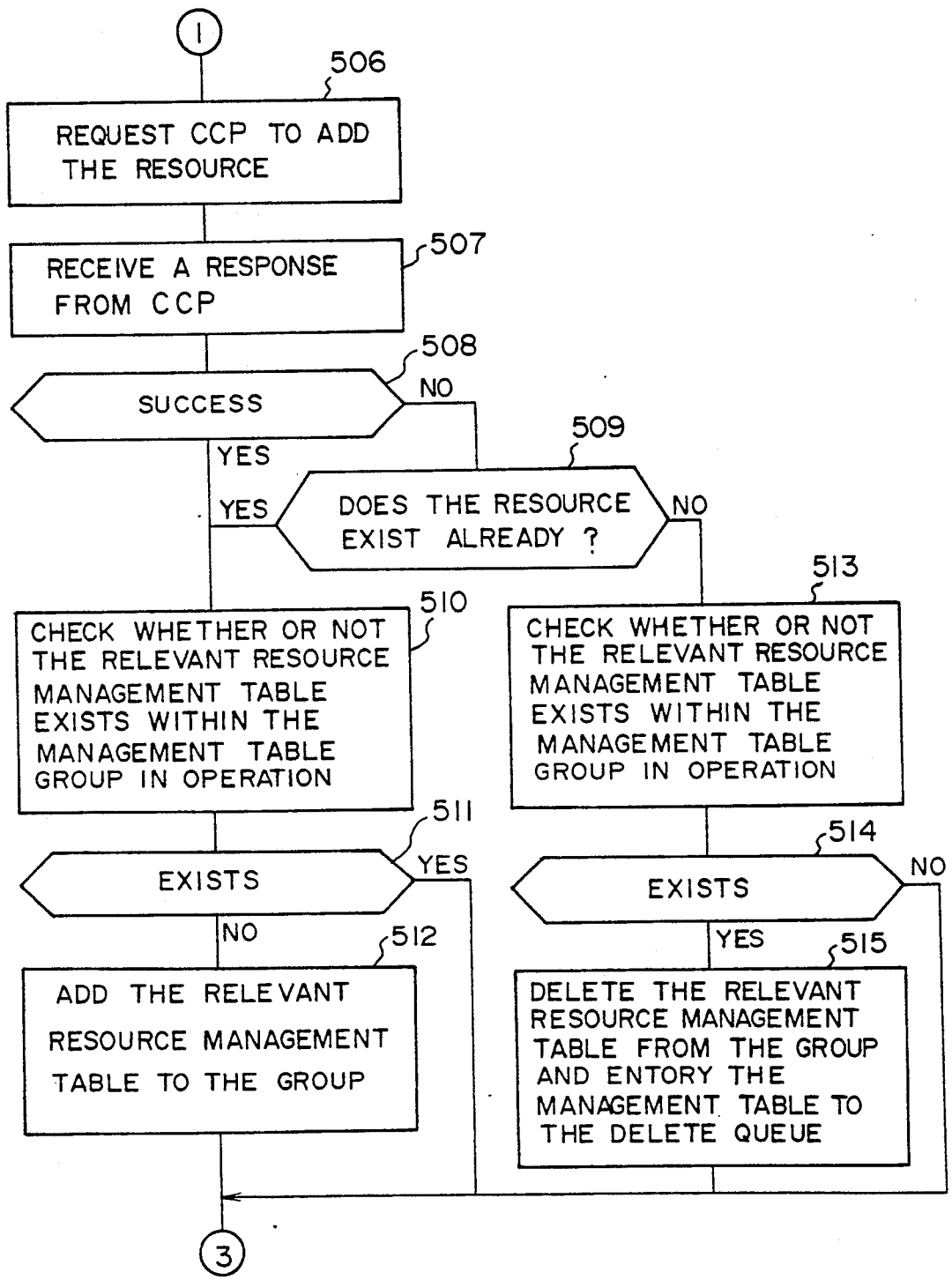
Figure 21C:
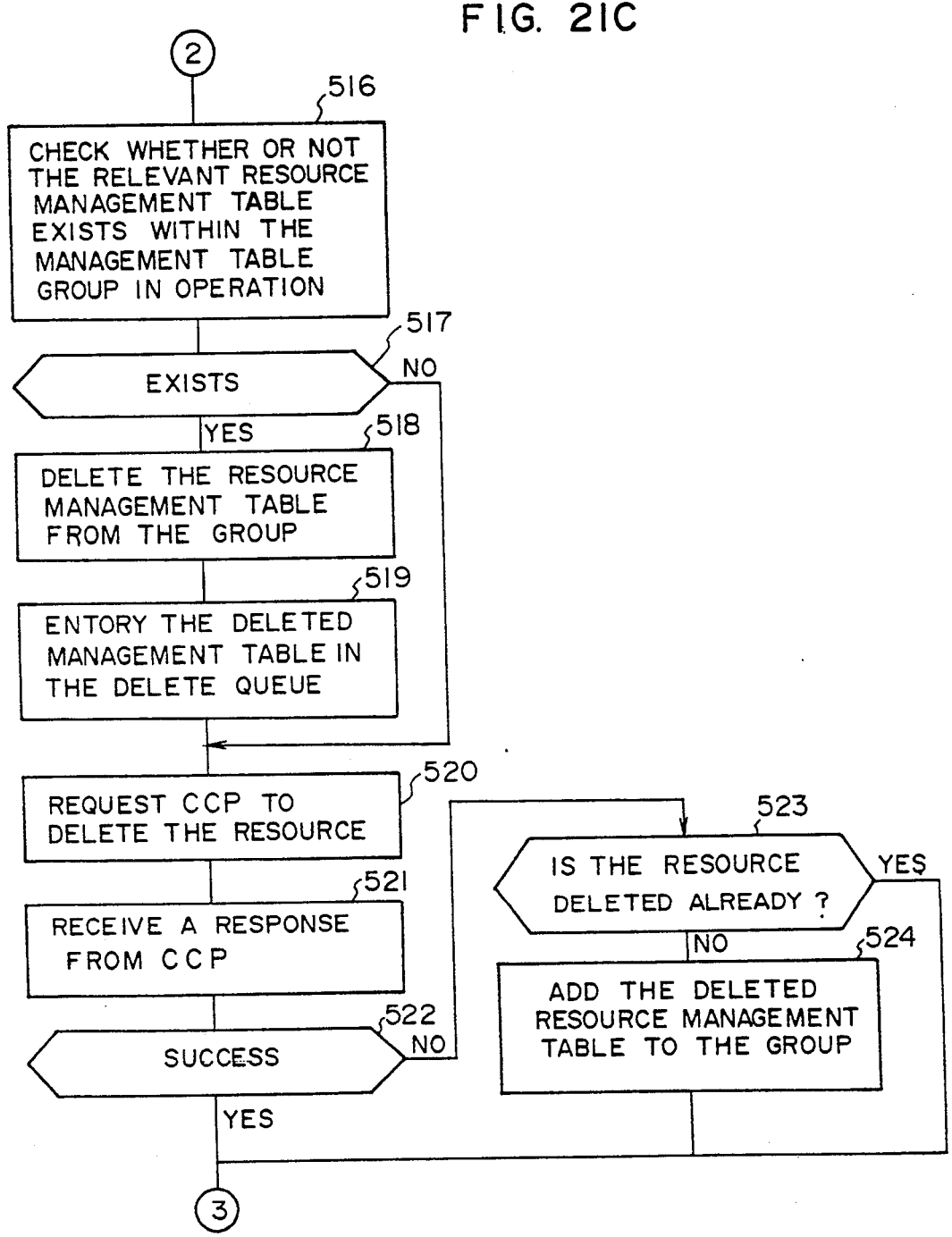

FIGS. 21A to 21C show an automatic reconfiguration routine 500 to be executed by a master host computer when the operation of CCP restarts, i.e., when the master host computer is connected again to CCP. First, the status of CCP is checked upon entering a START command (step 501). For example, a SNSE command is sent to CCP, this command is described in the HITAC Manual "M Series Processors", 8080-2 published October, 1983 by Hitachi Ltd. Whether or not a communication control program is running on CCP is checked from a sense byte sent back from CCP which responded the SNSE command. If the program is not running on CCP (step 502), a CCP load module is transferred to CCP and stored thereat (step 503). Reconfiguration resources related to CCP are sequentially taken out from the already read reconfiguration directories, in the same order as that executed before (step 504), to execute the following processes. Namely, if the taken-out resource is a resource to be added to CCP, a request of adding the resource is issued to CCP (step 506). A message for the addition request is formed in accordance with the information in the reconfiguration directory. A response of CCP is received (step 507). If the resource addition succeeds at CCP (step 508), it is checked if the resource management table for the resource in concern is already present in the resource management table group in operation (step 510). If not present (step 511), the resource management table for the resource in concern is added to the resource management table group in operation (step 512). If the resource addition fails at CCP (step 508), the cause of failure is checked (step 509). If the cause of failure originates from that "the resource in concern is already present", the process at step 510 is executed same as the success case. If not, it is checked if the resource management table for the resource is already present in the resource management table group in operation (step 513). If present (step 514), the resource management table for the resource is deleted from the resource management table group in operation, and the deleted resource management table is registered in the delete queue. With the above procedure, even a resource previously failed in being added (a resource not present in the resource management table group in operation) can be automatically added if the cause of failure has been eliminated.

If the resource taken out from the reconfiguration directory is a resource to be deleted (step 505), it is checked if the resource management table for the resource is present in the resource management table group in operation (step 516). If present (step 517), the resource management table for the resource is deleted from the resource management table group in operation (step 515), and the deleted resource management table is registered in the delete queue (step 519). If the resource management table for the resource is not present in the resource management table group in operation (step 517), these processes at steps 518 and 519 are not executed. Next, a message of requesting to add the resource is formed in accordance with the information in the reconfiguration directory, and transmitted to CCP (step 520). A response from CCP is received (step 521). If the addition request successes, the control advances to step 525 whereat it is checked whether there is a resource to be next processed. If the addition request fails, the cause of failure is checked (step 523). If the cause of failure originates from that "the resource is already deleted" (step 523), the control advances to step 525. If not, the resource management table for the deleted resource is taken out from the delete queue, and added again to the resource management table (step 524). With the above procedure, even a resource previously failed in being deleted can be automatically deleted if the cause of failure has been eliminated. The steps 504 to 524 are repeated for all resources related to CCP within all the already read reconfiguration directories.

As described above, according to the present invention, the automatic reconfiguration at the time of restarting the operation of CCP is executed in accordance with the information of the reconfiguration directory of the master host computer. In this case, since a CHANGE command can be executed at all host computers connected to a single CCP, the control of reconfiguration for CCP can be automatically executed even after a slave host computer is changed to a master host computer.

Furthermore, even a resource failed in reconfiguration upon execution of a CHANGE command at a certain time point, can automatically execute the reconfiguration procedure at the time of restarting the operation of a host computer or CCP, if the cause of previous failure has been eliminated. Therefore, it is not necessary for an operator to enter a CHANGE command.

METHOD OF CHECKING INTEGRITY BETWEEN HOST COMPUTER AND CCP

If a master is changed to a new host computer after executing the automatic reconfiguration at the time of restarting the operation of CCP (at the time of reconnecting the master host computer to CCP) by using the automatic reconfiguration method, there is a possibility of inconsistence of reconfiguration definition between the new master host computer and CCP. For example, such a case will occur when the new master host computer happens to forget entering a necessary reconfiguration command existing in the past. Furthermore, if the above-described automatic reconfiguration method is applied to CCP at the time of restarting the operation thereof, the previously executed reconfiguration is again executed for all resource related on CCP even if a program is running on CCP. This means that the already succeeded reconfiguration is unnecessarily executed again.

In order to solve these problems, according to another embodiment of the present invention, a host computer and CCP each store a reconfiguration sequence number and a processing status indicator, for each reconfiguration command executed. The reconfiguration sequence number represents the order of execution of a reconfiguration command. The processing status indicator indicates the execution result (success/- failure/under processing) of a reconfiguration command. When a host computer is connected again to CCP, the reconfiguration sequence number stored in the host computer is compared with the reconfiguration sequence number stored in CCP. If both the numbers are not coincident, an alarm message is caused to be outputted. In addition, the status of CCP is checked when a host computer is connected again to CCP. Under the condition that a necessary program is already running, if the reconfiguration sequence numbers of the host computer and CCP are coincident and if both the processing status indicators indicate "success" the previously executed reconfiguration command is determined not to be executed again, thereby dispensing with unnecessary processing. The above procedure will be described below in detail.

Figure 22:
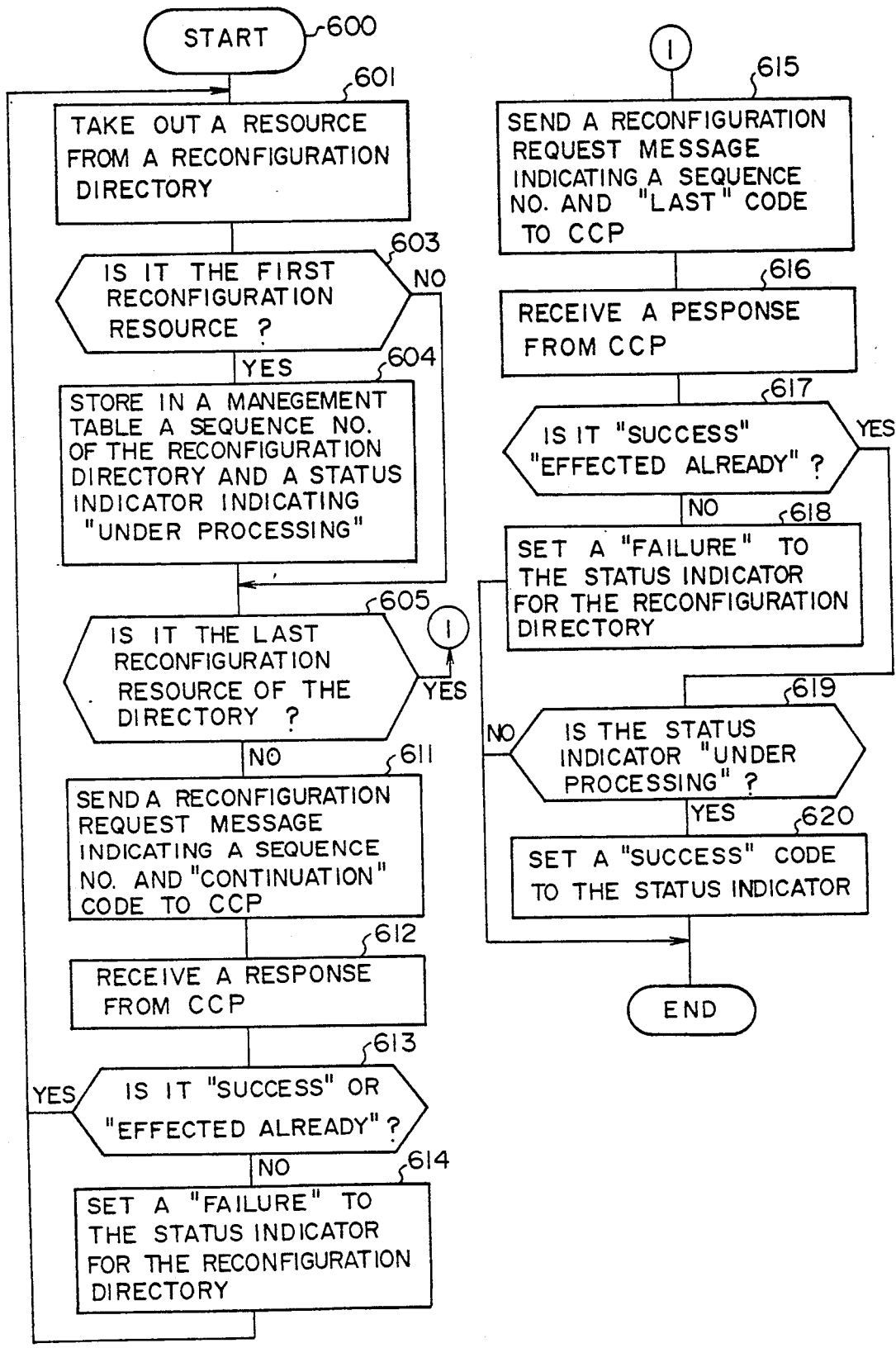
FIG. 22 is a flow chart illustrating a procedure to be executed by a host computer in response to a CHANGE command.

First, the procedure at a host computer upon execution of a CHANGE command will be described with reference to FIG. 22.

A reconfiguration resource is sequentially taken out from the reconfiguration directory designated by a CHANGE command, in the descending order starting from the highest hierarchical level (in the order indicated by the sequential pointer shown in FIG. 10 or 11).

Figure 23:
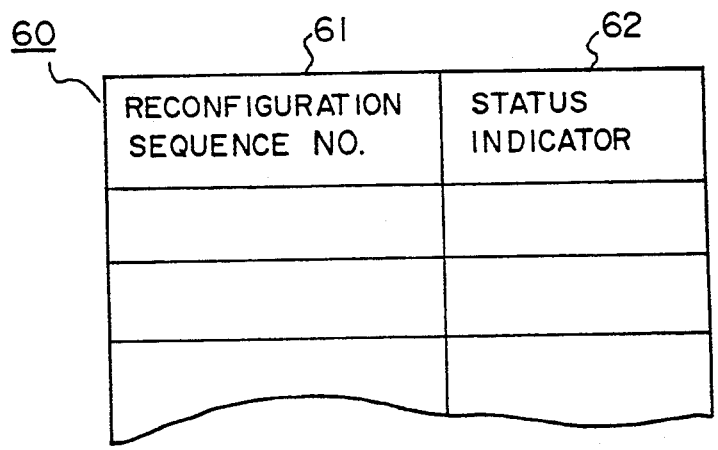
FIG. 23 shows the structure of a reconfiguration processing management table.
Figure 24A:
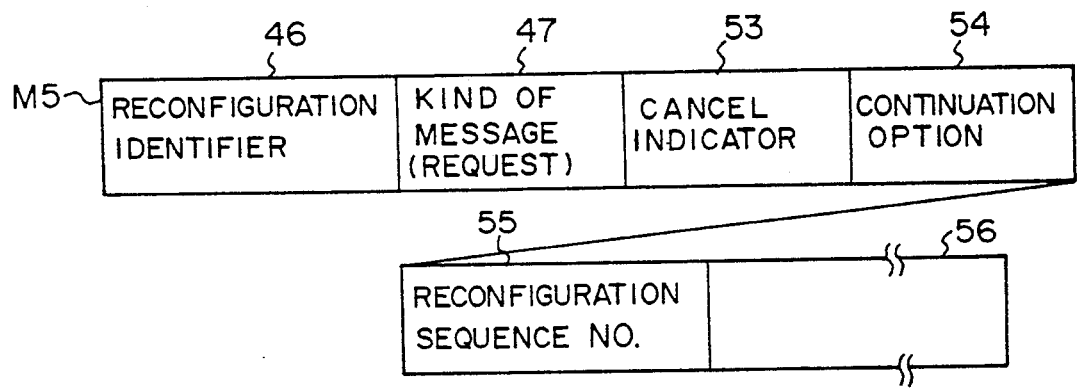
FIG. 24A shows the format of a message M5 transmitted from a host computer to CCP for checking the integrity of reconfiguration information between a host computer and CCP.
Figure 24B:
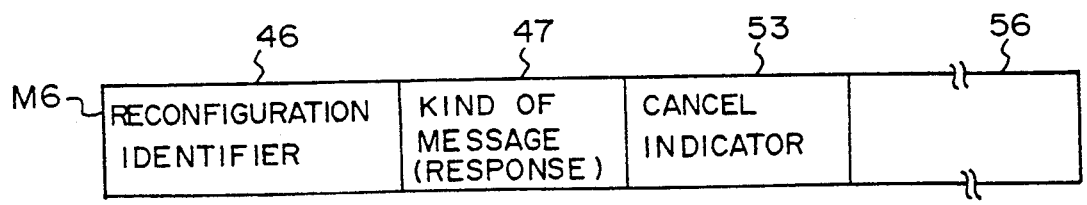
FIG. 24B shows the format of a message M6 sent back from CCP in response to the message M5.

If the taken-out reconfiguration resource is at the highest hierarchical level (step 603), the reconfiguration sequence number read from the reconfiguration sequence number is set to a field of a reconfiguration management table 60 shown in FIG. 23, and a code representative of "under processing" is set to a processing status indicator field 62 (step 604). Next, it is checked if the taken-out reconfiguration resource is the last one in the reconfiguration directory (step 605). If not the last one, there is sent to CCP a reconfiguration request message M5 having the reconfiguration sequence number and indicating a continuation option "continuous" (step 611). As illustratively shown in FIG. 24A, the reconfiguration request message includes a reconfiguration identifier field 46, a kind of message field 47, a cancel indicator field 53 (in the case of the reconfiguration request, it is represented by "01" for example), a continuation option field 54, a reconfiguration sequence number field 55, and another field 56. A response message M6 having the format shown in FIG. 24B is received from CCP in response to the reconfiguration request (step 612). If the processing result information code included in the field 56 of the response message indicates "success" or "effected already" (it means that the reconfiguration resource has been already reflected to the control table group for CCP ) ( step 613 ), the control returns to step 60 to repeat the above-described processes for the next reconfiguration resource. If the processing result information code indicates "failure" (step 613), a "failure" is set to the processing status indicator 62 of the reconfiguration processing management table 60 (step 614), to thereafter return to step 601.

If the last reconfiguration resource is taken out from the reconfiguration directory (step 605), there is sent to CCP a reconfiguration request message M5 whose field 55 is set with the reconfiguration sequence number read from the reconfiguration directory and the continuation filed 54 is set with "last" (step 615). A response message M6 is received from CCP in response to the reconfiguration request (step 615). If the processing result information code indicates "success" or "effected already" (step 617), and if the processing status indicator 62 of the reconfiguration management table 60 indicates "under processing" (step 619), the processing status indicator 62 is set with a "success" (step 620), to thereafter terminate this routine 600. If the processing result at CCP indicates "failure" (step 617), the processing status indicator 62 is set with a "failure" (step 618), to thereafter terminate the routine 600. If the reconfiguration resource taken out from the reconfiguration directory is an intermediate resource other than the last and first ones (step 603), the procedure at steps 611 to 614 is executed.

Figure 25:
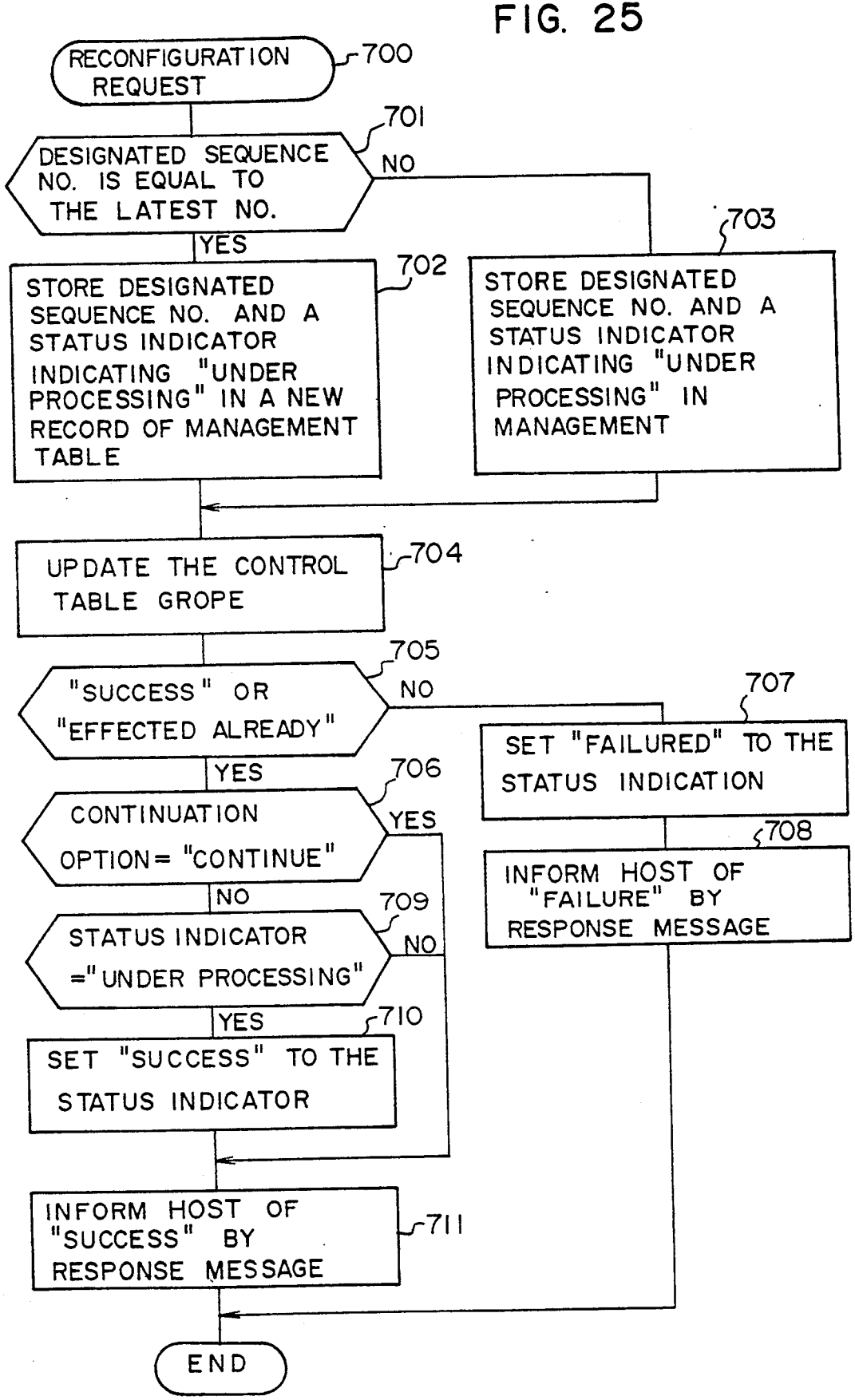
FIG. 25 is a flow chart illustrating another embodiment of the procedure to be executed by CCP in response to a reconfiguration request from a host computer.

Next, the routine 700 to be executed by CCP upon reception of the reconfiguration request message M5 will be described with reference to the flow chart shown in FIG. 25.

CCP compares the configuration sequence number 55 included in the received reconfiguration request message M5 with the latest sequence number in the reconfiguration directory of CCP (step 701). If the received sequence number is larger, it means that the requested reconfiguration has not been executed as yet by CCP. Such a case generally corresponds to the case when the CHANGE command is executed. In this case, CCP establishes a new record area within its management table similar to that shown in FIG. 23, and an "under processing" is set to the processing status indicator field corresponding to the sequence number designated by the reconfiguration request message M5 (step 702). If the received sequence number is not larger than that at CCP (step 701), an "under processing" is set to the processing status indicator field in the management table corresponding to the received sequence number.

In accordance with the reconfiguration request, the control table group is updated (step 704). If the reconfiguration process fails (if the reconfiguration process is neither "success" nor "effected already") (step 705), a "failure" is set to the processing status indicator in the management table for CCP (step 707), and thereafter a response message M6 indicating a failure is transmitted to the host computer (step 708). If the reconfiguration process succeeds or has been already effected (step 705), and if the continuity option field 54 of the request message M5 is "last" and the processing status indicator in the management. table at CCP indicates "under processing" (steps 706 and 709), the processing status indicator is set with "success" (step 710). Thereafter, a response message M6 informing "success/reflected already" is transmitted to the host computer (step 711). If the continuation option is "continuous" (step 706), or if the continuation option is "last" and the processing status indicator does not indicate "under processing" (steps 706 and 709), then the control advances to step 711 whereat a "success/effected already" is informed to the host computer.

It is also necessary to change the reconfiguration sequence number and processing status indicator when a CANCEL command is executed.

Figure 26:
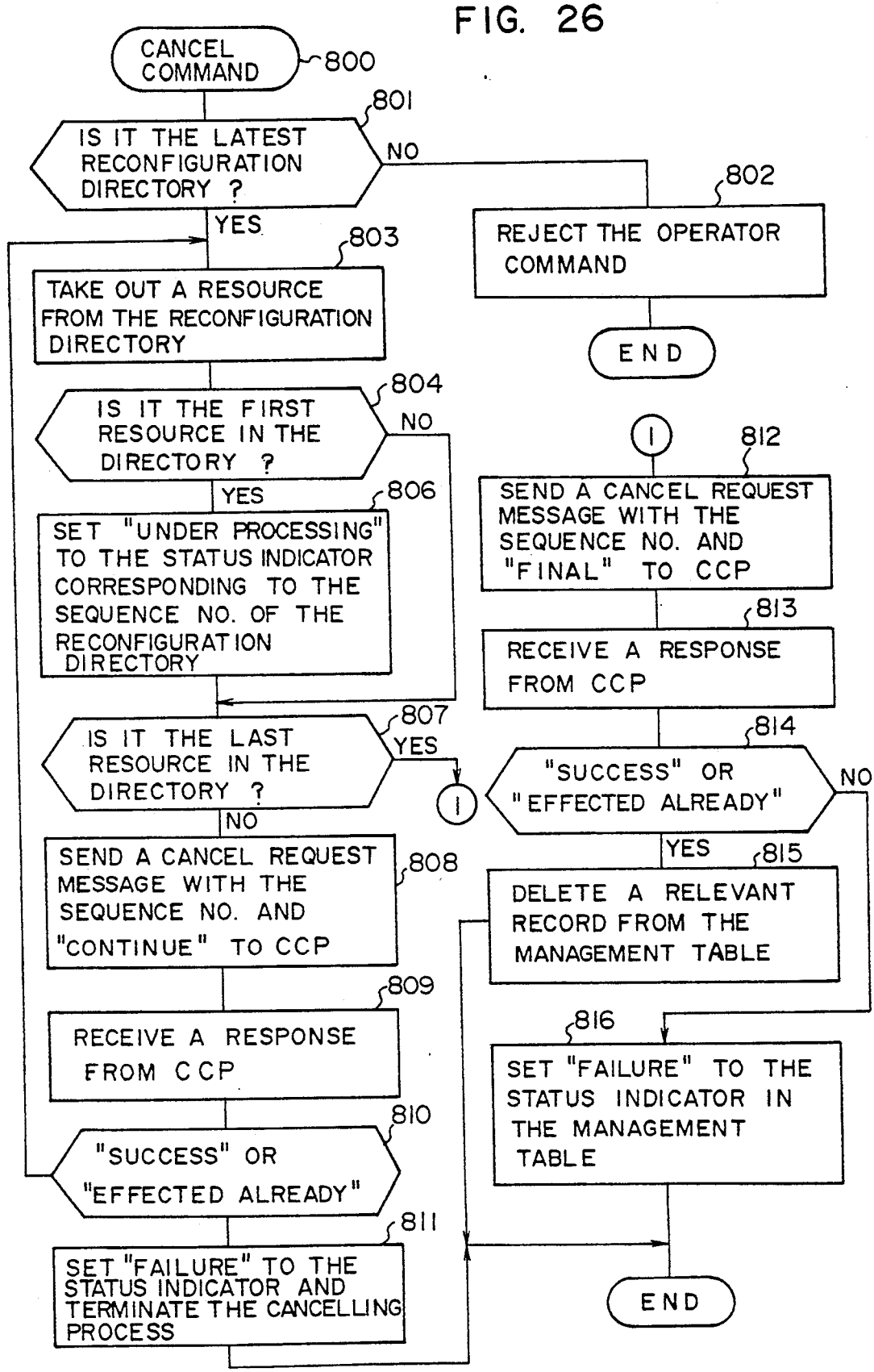
FIG. 26 is a flow chart illustrating another embodiment of the procedure to be executed by a host computer in response to a CANCEL command.

Next, the routine 800 to be executed by a host computer upon input of a CANCEL command will be described with reference to the flow chart shown in FIG. 26.

If an inputted CANCEL command does not designate the latest one of the reconfiguration directories to be processed (step 801), the operator command is rejected (step 802). If the latest directory, a resource is sequentially taken out from the designated reconfiguration directory, in the opposite order to that when a CHANGE command was executed (step 803). If the taken-out resource is the first resource in the reconfiguration directory, the processing status indicator corresponding to the sequence number of the reconfiguration sequence number in the reconfiguration processing management table 60 is set with "under processing" (step 806). If the resource is not the last one in the reconfiguration directory (step 807), a reconfiguration cancel request message M5 is transmitted to CCP, the message including a cancel indication code (e.g., "02") at the field 53, the reconfiguration sequence number read from the reconfiguration directory at the field 55, and an indication code "continuous" at the continuation option field 54 (step 808). The control waits for a reception of a response message M6 to be sent back from CCP in response to the cancel request (step 809). If the response message indicates "success" or "effected already" as the process result at CCP (step 810), the control returns to step 803 to execute the cancel process of the next reconfiguration resource. If the process result at CCP is "failure" (step 810), the corresponding processing status indicator in the management table is set with "failure" to terminate the cancel process (step 811). If the resource taken out from the reconfiguration directory is the last one of the reconfiguration resources in the directory (step 807), a cancel request message is transmitted to CCP, the message including the reconfiguration sequence number and "last" at the continuation option field 54 (step 812). When the response message M6 is received from CCP, the process result at CCP is checked (step 814). If the process result indicates "success" or "effected already" the management record having the corresponding sequence number is deleted from the reconfiguration processing management table 60 (step 815). to thereafter terminate this routine 800. If the process result at CCP indicates "failure" (step 814), a "failure" is set to the corresponding processing status indicator in the management table 60 (step 816), to thereafter terminate this routine 800. If the resource taken out from the directory is an intermediate resource other than the latest and last ones, the processes at steps 808 to 811 are executed.

Figure 27:
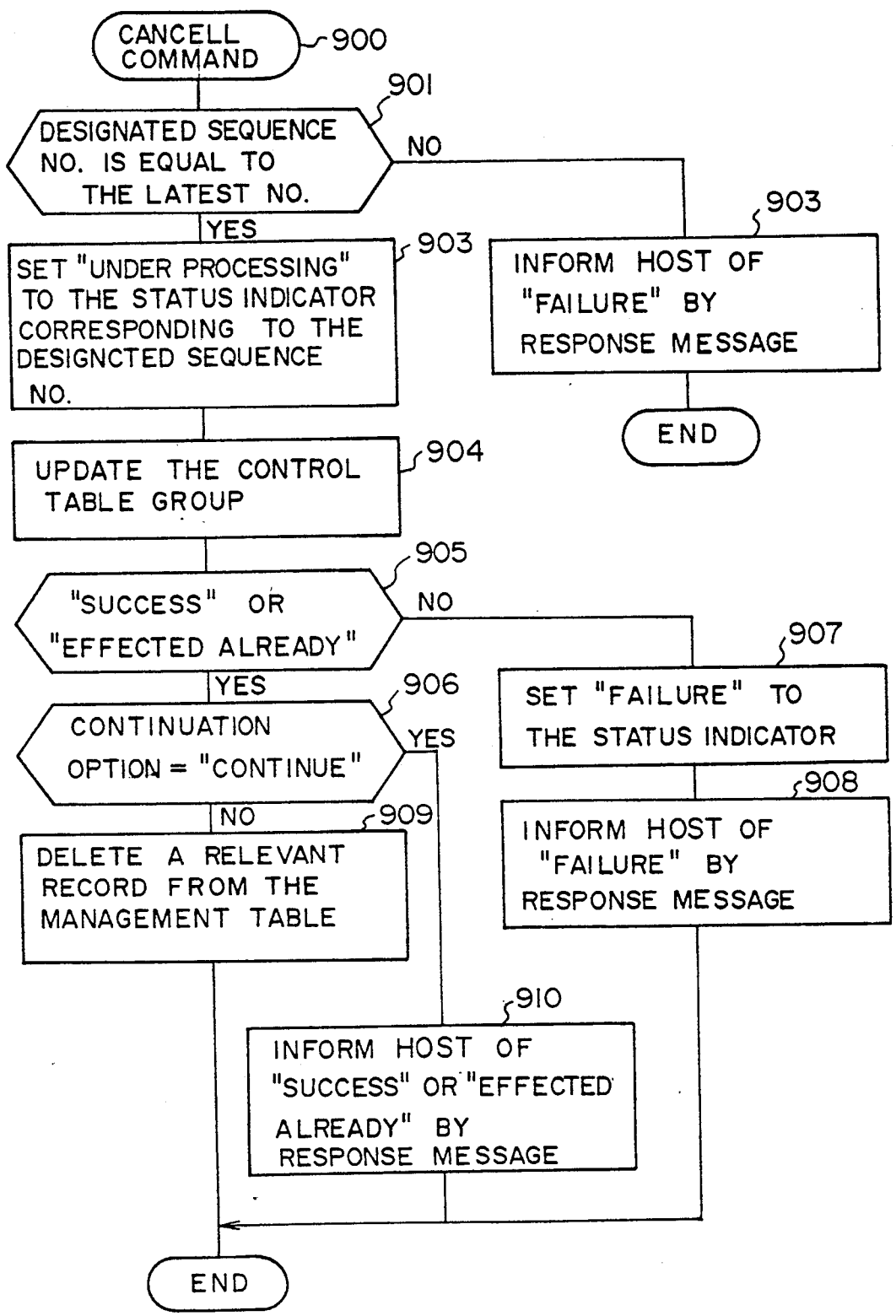
FIG. 27 is a flow chart illustrating another embodiment of the control procedure to be executed by CCP in response to a CANCEL command entered from a host computer.

Next, referring to FIG. 27, the routine 900 to be executed by CCP upon reception of the reconfiguration request message M5 from the host computer will be described.

If the reconfiguration sequence number received from the host computer is not the latest one (step 901), the host computer is informed of a "failure" by the response message M6 (step 903). If the designated sequence number is the latest one (step 901), an "under processing" is set to the processing status indicator corresponding to the sequence number in the management table at CCP (step 902). Next, the control table group is updated (step 904). If the reconfiguration process result is "success" or "effected already" (step 905), and the continuation option field 54 of the cancel request message M5 indicates" continuous" then the host computer is informed of "success/effected already" as the process result by the message M6 (step 910).

If the continuation option is "last" (step 906), the records associated with the delete process (sequence number and processing status indicator) are deleted from the management table (step 909). If the "effected already" process for the control table fails (step 905), a "failure" is set to the processing status indicator, and the host computer is informed of a "failure" by the response message M6.

Figure 28:
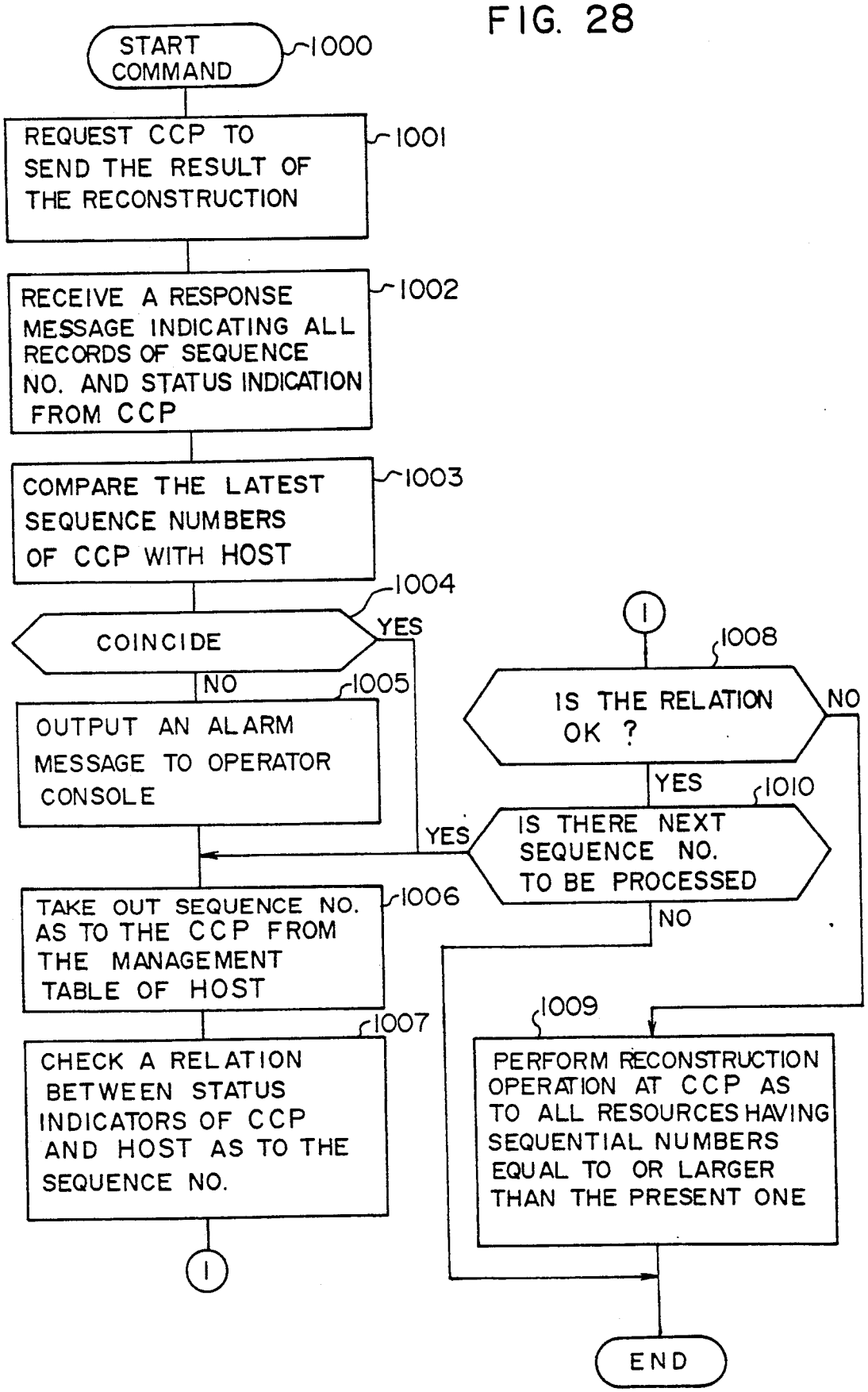
FIG. 28 is a flow chart illustrating another embodiment of the control procedure to be executed by a host computer in response to a START command.

Next, referring to FIG. 28, the routine 1000 will be described for the reconfiguration process for CCP to be executed by the host computer upon input of a START command.

When a START command is inputted, the host computer transmits a transfer request message for the reconfiguration process result to CCP (step 1001). Of a response message sent back from CCP in response to the request, there are derived all reconfiguration sequence numbers presently held by CCP and corresponding processing status indicators (step 1002). The host computer compares latest reconfiguration sequence numbers related to CCP and stored in the host computer with the latest reconfiguration sequence numbers informed by CCP, to check if they are coincident to each other (step 1003). If the coincident (step 1004), an alarm message is outputted to the operator console (step 1005).

If the reconfiguration sequence number of CCP is larger than that of the host computer, the host computer has a possibility that it has a reconfiguration directory to which a CHANGE command was not executed. On the other hand, if the reconfiguration sequence number of the host computer is larger than that of CCP, another host computer connected to CCP (a past master host computer) has a possibility that it has a reconfiguration directory to which a CHANGE command was not executed). In view of this, the reconfiguration sequence number associated with CCP and stored in the host computer is sequentially taken out in the execution order of reconfiguration (step 1006), and the following procedure is executed for each reconfiguration directory corresponding to each sequence number. First, a relation is checked between processing status indicators of CCP and the host computer as to the sequence number. Specifically, it is checked if the processing status indicator in the management table of the host computer indicates "success" or not, or if the reconfiguration sequence number informed by CCP is coincident with the taken-out reconfiguration sequence number and the corresponding processing status indicator indicates "success" or not (step 1007). If these conditions are satisfied (step 1008), the reconfiguration directory is not necessary to be subject to an automatic reconfiguration process at CCP. If the conditions are not satisfied (step 1008), all reconfiguration directories appeared after the directory in concern are subjected to an automatic reconfiguration process at CCP by the procedure shown in FIGS. 21A to 21C and FIGS. 22 and 25 (step 1009).

The above procedure will be described using particular examples.

Figure 29:
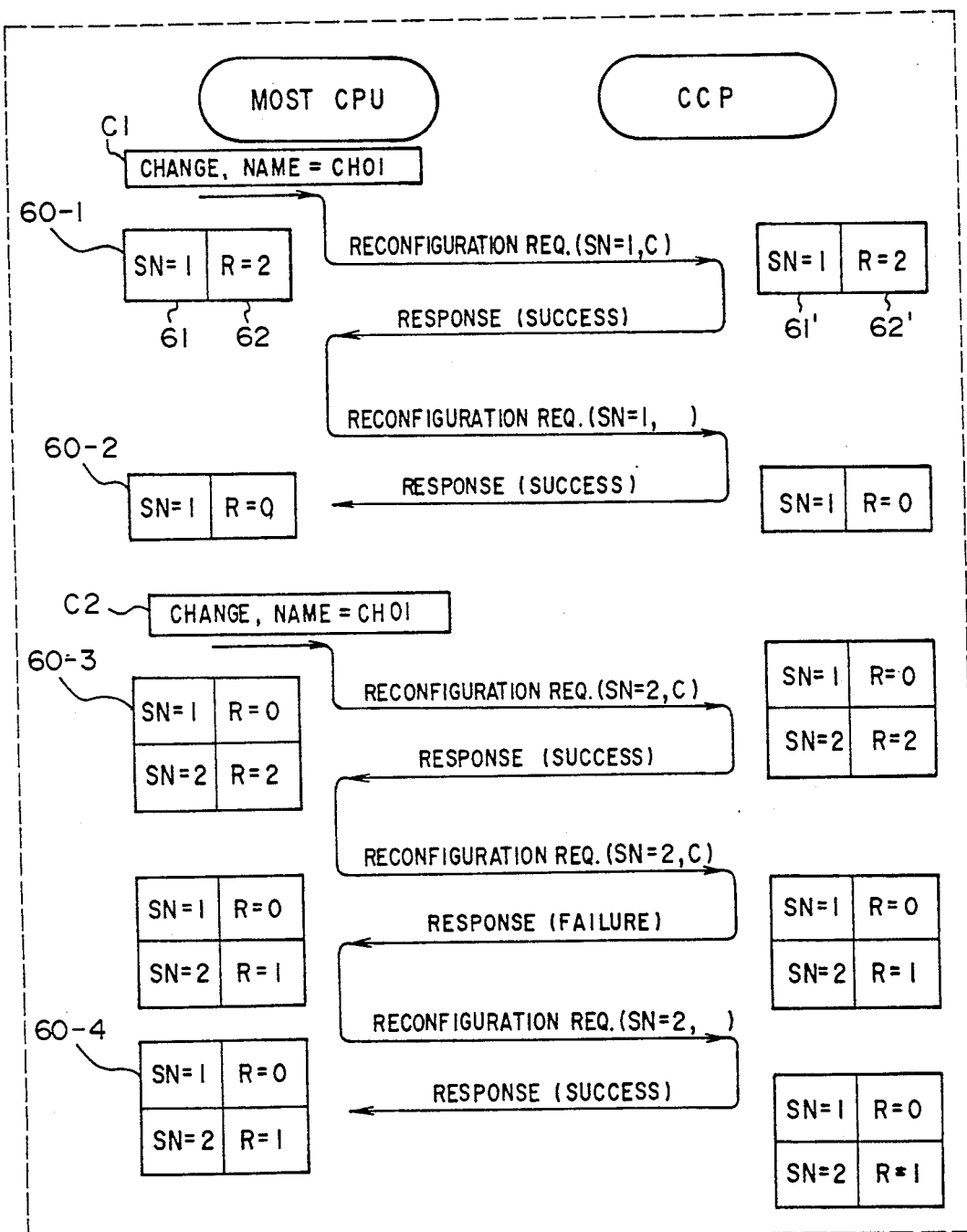
FIG. 29 is a diagram showing a change in reconfiguration sequence numbers and processing status indicators when CHANGE commands are executed.

FIG. 29 illustrates a process example wherein as the reconfiguration directories having file names "CH01" and "CH02" are sequentially subject to the reconfiguration process, some resource in the directory "CH01" fails its reconfiguration process. In FIG. 29, C1 and C2 represent an operator input command at the host computer, SN represents the reconfiguration sequence number 61 in the reconfiguration processing management table 60, R represents the processing status indicator 62, R=0 represents a "success" R=1 represents a "failure", and R=2 represents an "under processing".

Figure 30:
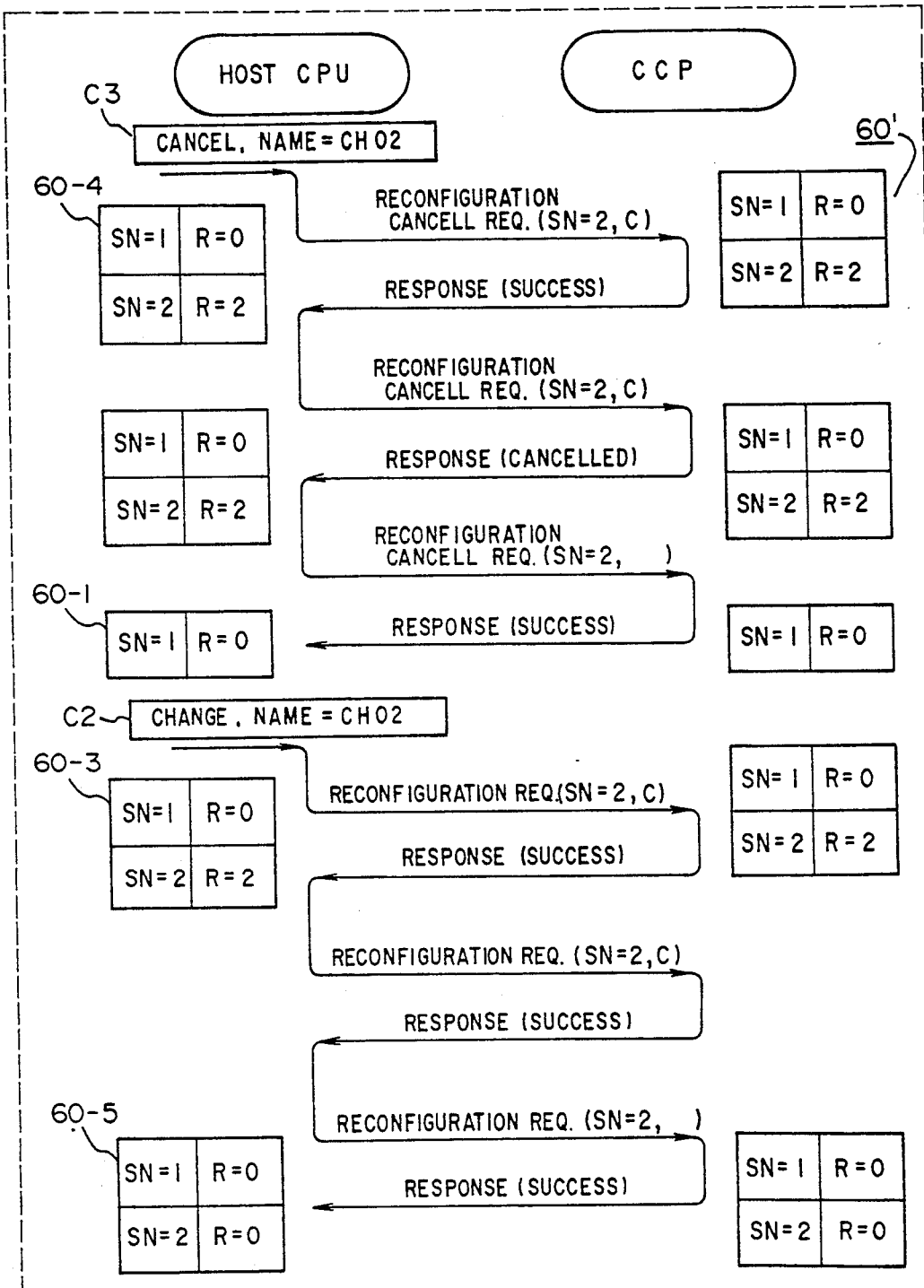
FIG. 30 is a diagram showing a change in reconfiguration sequence numbers and processing status indicators when the reconfiguration process is again executed for the reconfiguration directory "CH02" shown in FIG. 29 which was once canceled by a CANCEL command.

FIG. 30 illustrates a process example wherein a CANCEL command C3 is executed after executing the CHANGE command C2 shown in FIG. 29 to temporarily cancel the directory "CH02" and thereafter the CHANGE command C2 is again executed to carry out the reconfiguration process of the directory "CH02", resulting in a normal completion of the process.

Figure 31:
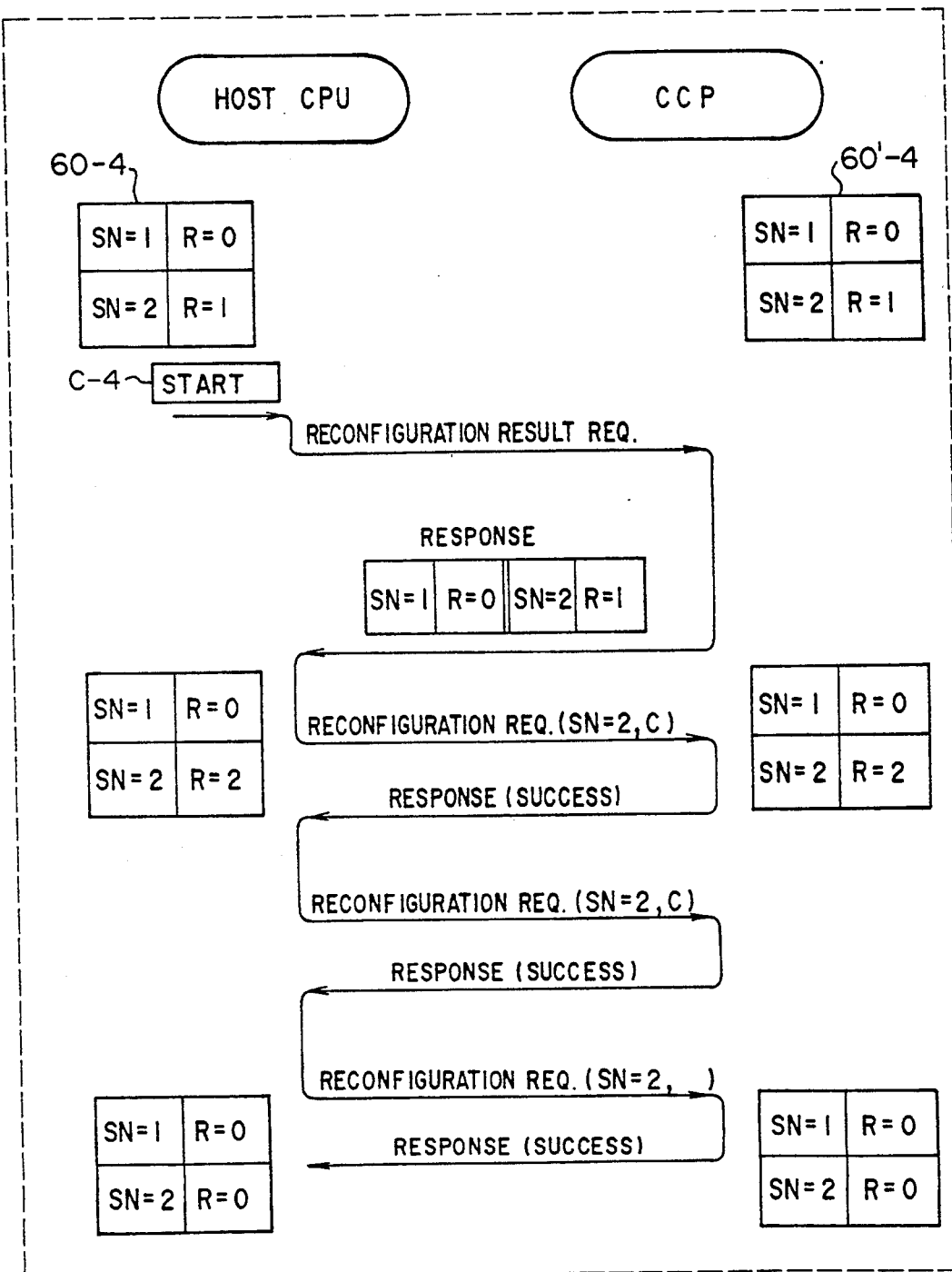
FIG. 31 is a diagram illustrating the procedure wherein after the directory "CH02" shown in FIG. 29 has failed its reconfiguration process, CCP is restarted using a START command.

FIG. 31 illustrates a process example wherein after executing the CHANGE command C2 shown in FIG. 29, a START command C4 is executed to restart the operation of CCP. In this example, the reconfiguration sequence numbers 2 in the management tables 60-4 and 60'-4 of the host computer and CCP indicate that the corresponding directories failed their reconfiguration processes (R=1). Therefore, the routine shown in FIG. 28 is automatically executed so that the resource in the reconfiguration directory "CH02" is subject to the reconfiguration process.

Figure 32:
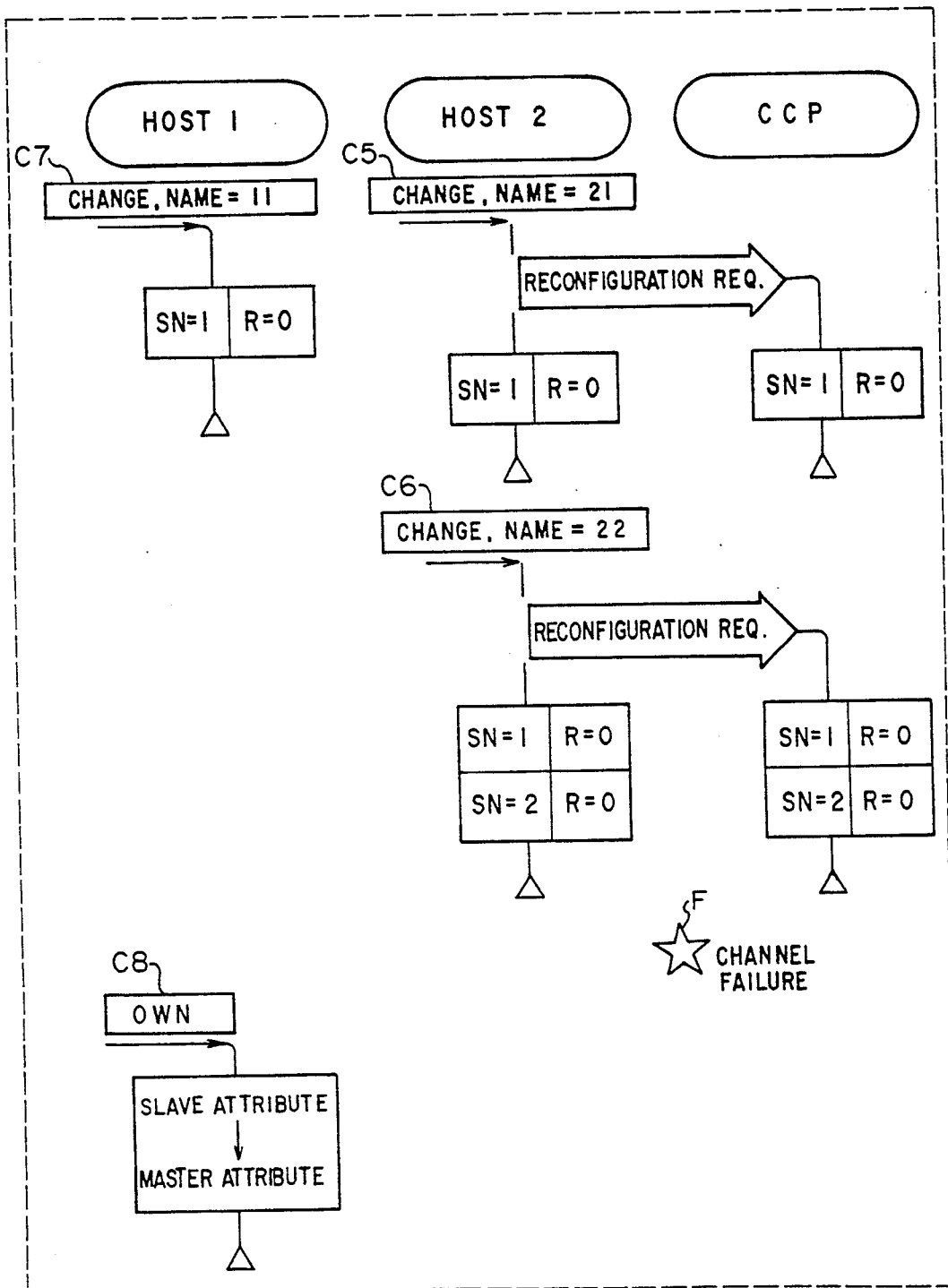
FIG. 32 illustrates switching to a new master host computer upon occurrence of a channel trouble.
Figure 33:
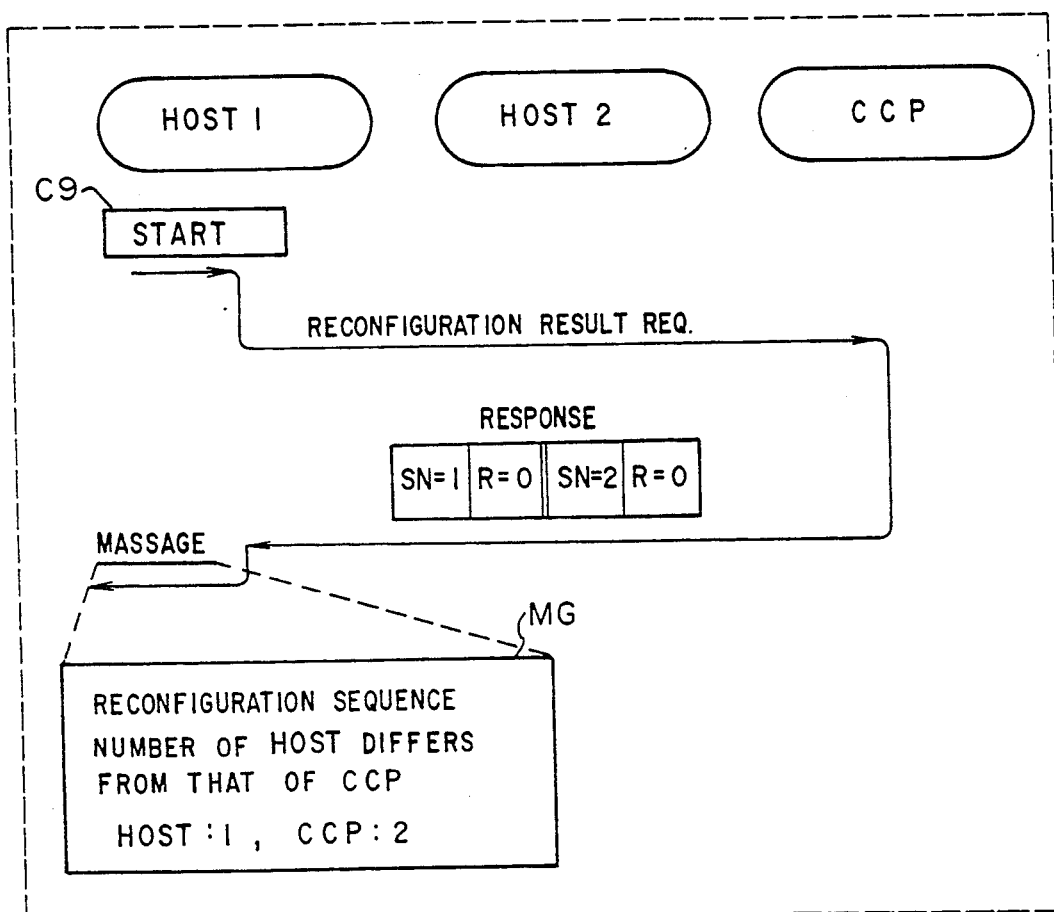
FIG. 33 is a diagram used for explaining the operation when reconfiguration information becomes inconsistent between a master host computer and CCP.

FIG. 32 illustrates a process example wherein HOST 2 (master attribute) executes CHANGE commands C5 and C6 for the reconfiguration directories having file names "CH11" and "CH21" HOST 1 (slave attribute) executes a CHANGE command C7 only for the reconfiguration directory "CH11" and thereafter because of occurrence of a channel trouble between HOST 2 and CCP, an OWN command is executed to change the attribute of HOST 1 to a master attribute. In this condition, if the new master HOST 1 activates CCP using the START command C9 as shown in FIG. 33, it can be recognized that the latest reconfiguration sequence numbers of HOST 1 and CCP are not coincident. In this case, the reconfiguration sequence number (SN=2) of CCP is newer than that (SN=1) of HOST 1. Therefore, a message MG is outputted to the operator console so that the operator is informed of the fact that HOST 1 has a reconfiguration directory to which the CHANGE command was not executed.

As appreciated from the description of the above embodiments, the present invention allows a dynamic reconfiguration operation while minimizing contradiction of reconfiguration definition information between host computers or between a host computer and CCP.

In the above described embodiments, the system arrangement has been described wherein a single CCP is connected to a plurality of host computers. The present invention is also applicable to a system arrangement wherein a single CCP is connected to a single host computer, or a plurality of CCPs are connected to a plurality of host computers. In the latter case, of host computers connected to a certain CCP, one host computer becomes a master, and the others become slaves. All host computers connected to the CCP share CCP load module files and reconfiguration directory files for the resources connected to the CCP.

Figure 34:
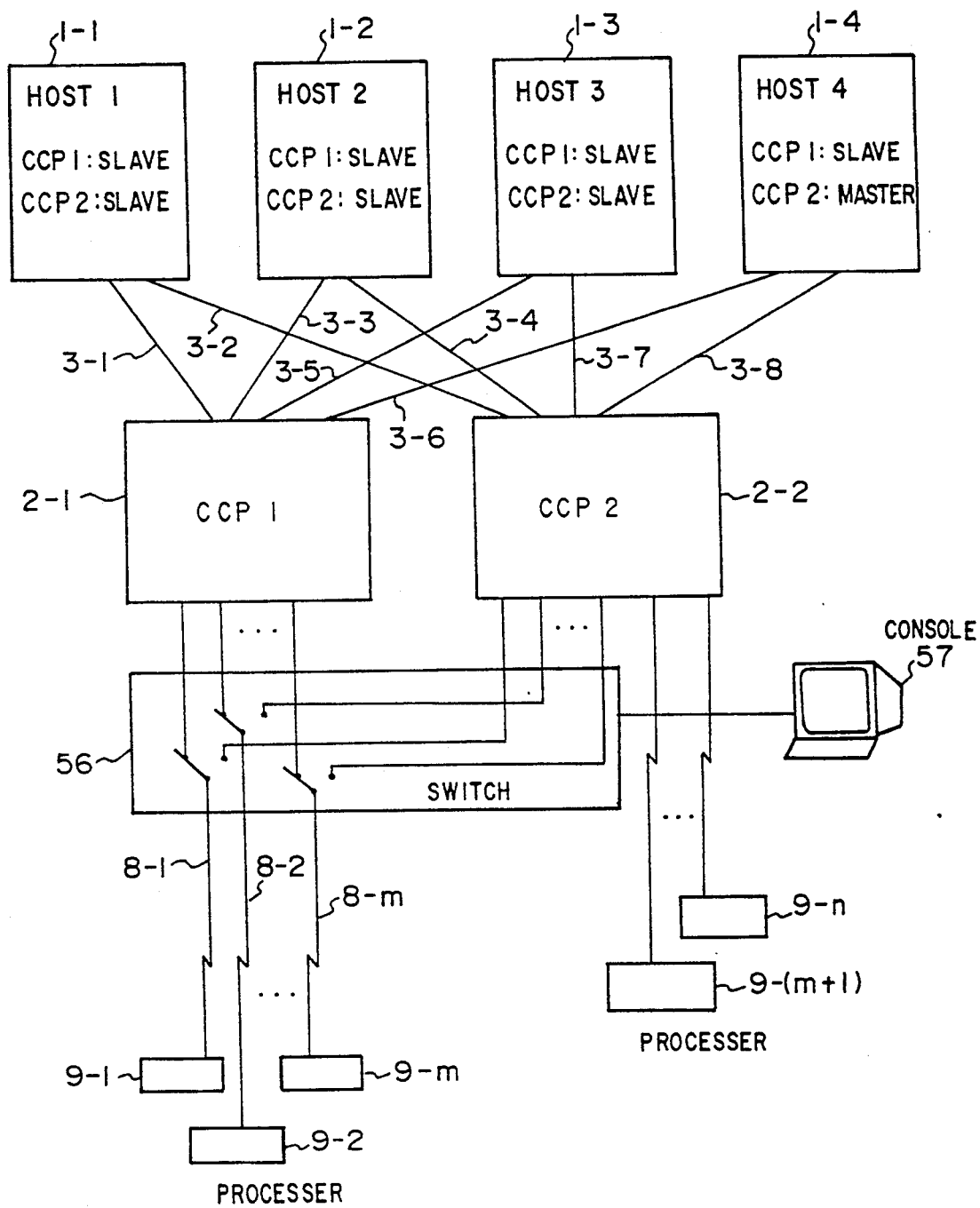
FIG. 34 is a diagram showing another computer network system arrangement applicable to the present invention.

FIG. 34 shows an example of another system arrangement applicable to the present invention.

In the system arrangement shown in FIG. 34, each of CCP 1 (2-1) and CCP 2 (2-2) is connected with a plurality of host computers 1-1 to 1-4. The master for CCP 1 is the host computer 1 (1-4), and the master for CCP 2 is the host computer 4 (1-4). if a trouble occurs at CCP 1, a line switch 56 changes a connection of lines (8-*l* to 8-*m*) from CCP 1 to CCP 2 upon reception of an instruction from a console 57. With such a system arrangement, the present invention allows processors 9-*l* to 9-*m* having communicated with CCP 1 before the trouble to communicate with the host computer via CCP 2, using the following procedure.

First, line connected to CCP1 are switched to CCP 2 by the line switch 56. Next, in the manner described with the foregoing embodiments, information of the lines 8-*l* to 8-*m* and processors 9-*l* to 9-*m* connected to CCP 1 is deleted from the network configuration definition information loaded in the programs running on the host computer and CCP. Thereafter, the deleted resources are added to CCP 2.

The system arrangement shown in FIG. 34 may be extended to another system arrangement wherein lines connected to n CCPs may be switched to be connected to a particular one of CCPs.

According to the present invention, in a computer system arrangement wherein a CCP is connected to at least one host computer, the configuration definition information for both the host computer and CCP can be changed while the programs run on the host computer and CCP. Furthermore, even if the network configuration definition information changed upon execution of a configuration change command is inconsistent with the actual physical structure, because of, for example, erroneous definition, it is not necessary to enter the corrected configuration command, but by merely inputting a command of canceling a part of the previously executed reconfiguration, it becomes possible to correct the entered configuration definition information, thereby improving the system operability and operator handling.

Still further, if a host computer restarts its operation by loading a program while a CCP is under operation, the already executed reconfiguration information is again sent to the CCP. In this case, the reconfiguration previously failed is again executed so that an inconsistence of configuration definition information between the host computer and CCP can be avoided. In the case of restarting a host computer or CCP, even if the master was changed to another host computer, an inconsistence of configuration definitions, if any, between the new master host computer and CCP can be detected and such an effect is outputted as an operator message.

What is claimed is:

1. A method of processing reconfiguration information for a network system including at least one host computer provided with network configuration definition information and a dictionary file for storing a plurality of reconfiguration directories each including a reconfiguration designating data for defining a relation between said network and a resource to be deleted from or added to said network, a communication control processor connected to said host computer, and a plurality of resources connected to said communication control processor, said network reconfiguration information processing method comprising the steps of:

supplying, by an operator, a new reconfiguration directory to said host computer;

inputting by said operator a reconfiguration command designating said new reconfiguration directory for instructing said host computer to update said network configuration definition information; and, responsive to said reconfiguration command, reconfiguring said network configuration definition information by said host computer in accordance with the reconfiguration designating data defined within said new reconfiguration directory designated by said reconfiguration command, and storing said new configuration directory in said directory file.

2. A network reconfiguration information processing method for use with a network system including at least one host computer provided with network configuration definition information and a directory file for storing a plurality of reconfiguration directories each including at least a reconfiguration designating data for defining a relation between said network and a resource to be deleted from or added to said network, a communication control processor connected to said host computer, and a plurality of resources connected to said communication control processor, the network reconfiguration information processing method comprising the steps of:

supplying, by an operator of the network system, a reconfiguration directory to said host computer to add the reconfiguration directory in said directory file;

inputting, by said operator, a reconfiguration command for instructing said host computer to update said network configuration definition information;

responsive to said reconfiguration command, reconfiguring said network configuration definition information, by said host computer, in accordance with a reconfiguration designating data defined within said reconfiguration directory which is designated by said reconfiguration command;

inputting, by said operator, a cancel command designating a one of said reconfiguration directories stored in said directory file, instructing said host computer to cancel at least a part of already executed reconfigurations of said network configuration definition information; and, responsive to said cancel command, performing a cancellation of a part of the reconfiguration of said network configuration definition information already executed in accordance with said defined reconfiguration designating data within said designated reconfiguration directory, to restore said network configuration definition information to a state before the reconfiguration, and to delete a one of said reconfiguration directories from said directory file in accordance with the reconfiguration designating data within a reconfiguration directory designated by said cancel command.

3. The network reconfiguration information processing method according to claim 2, further comprising, when said designated reconfiguration directory contains said reconfiguration designating data for a plurality of resources, the steps of:

executing the reconfiguration of said network configuration definition information, by said host computer, in response to said reconfiguration command so as to sequentially add or delete a resource to or from said network, in the order that said reconfiguration designating data was described in said reconfiguration directory; and, executing the cancellation of the reconfiguration of said network configuration definition information, by said host computer, in response to said cancel command in the reverse order of having described said reconfiguration designating data in said reconfiguration directory.

4. The network reconfiguration processing method according to claim 2, further comprising when the reconfiguration designating data within said directory designated by said reconfiguration command or said cancel command relates to a source to be connected to said communication control processor, the steps of:

communicating, by said host computer to said communication control processor, a control command instructing the communication control processor to reconfigure network configuration definition information stored in said communication control processor in accordance with said reconfiguration designating data; and, in response to said control command, reconfiguring, in said communication control processor the network configuration definition information stored in said communication control processor.

5. The network reconfiguration information processing method according to claim 4, further comprising, when the reconfiguration designating data within said designated reconfiguration directory relates to a plurality of resources, the steps of:
said host computer and said performing said reconfiguration of said network configuration definition information by said host computer and said communication control processor such that a resource is sequentially added to or deleted from said network, in an order that said reconfiguration designating data was described in said reconfiguration directory; and,
cancelling the reconfiguration of said network configuration definition information, by said host computer and said communication control processor, in a reverse order of that described by said reconfiguration designating data in said reconfiguration directory.

6. The network reconfiguration information processing method according to claim 2, further comprising the steps of:
storing by said host computer said reconfiguration command in a reconfiguration history file; and
after executing said cancel command, deleting by said host computer a reconfiguration command corresponding to said reconfiguration directory designated by said cancel command, from said reconfiguration history file.

7. The network reconfiguration information processing method according to claim 6, further comprising:
maintaining, in said host computer, original network configuration definition information; and,
when said host computer restarts upon loading a program, said host computer sequentially reconfigures said original network configuration definition information in accordance with reconfiguration commands read out from said reconfiguration history file to generate current network configuration definition information.

8. A method of processing reconfiguration information in a network system including a plurality of host computers at least one of which operates as a master while others operate as slaves, each of said host computers being provided with configuration definition information and a directory file for storing a plurality of reconfiguration directories, at least one communication control processor provided with configuration definition information and commonly connected to said plurality of host computers, and a plurality of resources connected to said plurality of host computers, and a plurality of resources connected to said communication control processor, said network reconfiguration information processing method comprising the steps of:
supplying, to each of said host computers by an operator of the network system, a reconfiguration directory, said reconfiguration directory including at least one reconfiguration designating data for defining a relation between said network and a resource to be deleted from or added to said network;
issuing, by said operator, a reconfiguration command designating said reconfiguration directory to each of said host computers;
responsive to said reconfiguration command, reconfiguring said network configuration definition information in accordance with the reconfiguration designating data within said reconfiguration directory designated by said reconfiguration command and storing said designated reconfiguration directory in said directory file, by each of said host computers, respectively; and,
when said reconfiguration designating data within said reconfiguration directory corresponds to a resource to be connected to said communication control processor, transmitting, from said master host computer to said communication control processor, a control command instructing said communication control processor to reconfigure said network configuration definition information in said communication control processor in accordance with said reconfiguration designating data.

9. The network reconfiguration information processing method according to claim 8, further comprising the steps of:
issuing, to each of said plurality of host computers by the operator, a cancel command designating at least one of said reconfiguration directories stored in said directory file, for instructing a canceling of at least a part of already executed reconfiguration of said network configuration definition information;
responsive to said cancel command, cancelling at least a part of the reconfiguration directories of said network configuration definition information, by each of said host computers, so as to restore said network configuration definition information to a state as before the recognition already executed in accordance with the reconfiguration designating data within said designated reconfiguration directory, and deleting said designated reconfiguration directory from said directory file, respectively; and,
when said reconfiguration designating data within said reconfiguration directory designated by said cancel command corresponds to a resource of said communication control processor, transmitting, from said master host computer to said communication control processor, a control command instructing said communication control processor to cancel a part of the reconfiguration of said network configuration definition information of said communication control processor in accordance with the reconfiguration designating data.

10. The network configuration information processing method according to claim 9, further comprising, when said reconfiguration designating data within said designated reconfiguration directory corresponds to a plurality of resources, the steps of:
executing the reconfiguration of said network configuration definition information of each of said host computers and said communication control processor in response to said reconfiguration command so as to sequentially add or delete a resource to or from said network in the order that said reconfiguration designating data was described in said reconfiguration directory; and
executing the cancellation of the reconfiguration of said network configuration definition information of each of said host computers and said communication control processor in response to said cancel command so as to sequentially add or delete a resource to or from said network in the reverse order of said reconfiguration designating data in said reconfiguration directory.

11. The network reconfiguration information processing method according to claim 9, further comprising the steps of:
  storing, by each of said host computers, said reconfiguration command in a reconfiguration history file; and,
  after executing said cancel command, deleting, by each of said host computers, a reconfiguration command corresponding to said reconfiguration directory designated by said cancel command, from said reconfiguration history file.

12. The network reconfiguration information processing method according to claim 11, further comprising:
  storing, in each of said host computers, original network configuration definition information; and,
  when said host computer restarts upon loading a program, each of said plurality of host computers sequentially reconfigures said original network configuration definition information in accordance with said reconfiguration command read out from said reconfiguration history file to generate current network configuration definition information.

13. The network reconfiguration information processing method according to claim 10, further comprising, when said cancel command has been executed normally, each of said host computers deletes at least one of said reconfiguration commands corresponding to said reconfiguration directory by said cancel command, from said reconfiguration history file.

14. A method of processing reconfiguration information in a network system including a plurality of host computers at least one of which operates as a master and others operate as slaves, each of said plurality of host computers being provided with configuration definition information and a directory file for storing a plurality of reconfiguration directories, at least one communication control processor provided with configuration definition information related thereto and commonly connected to said host computers, and a plurality of resources connected to said communication control processor, said network reconfiguration information processing method comprising the steps of:
  inputting to a first one of said host computers a command designating a one of said plurality of reconfiguration directories for instructing a reconfiguration of said network configuration definition information of said first host computer, said reconfiguration directory including a reconfiguration designating data related to at least one resource to be added to or delete from said network;
  reconfiguring, by said one host computer, said network configuration definition information of said first host computer in accordance with a format of said inputted command and the contents of said designated reconfiguration directory;
  when said first host computer is a master and said reconfiguration designating data within said designated reconfiguration directory corresponds to a resource of said communication control processor, transmitting, from said master host computer to said communication control processor, a control command instructing said communication control processor to reconfigure said network configuration definition information of said communication control processor in accordance with the format of said inputted command and the content of said reconfiguration designating data, said control command including a reconfiguration directory, and an indicator for indicating that said reconfiguration directory is the last one to be processed by said communication control processor;
  reconfiguring the network configuration information of said communication control processor in response to said control command, by said communication control processor;
  updating, by said communication control processor, first status information stored in correspondence with said reconfiguration sequence number in accordance with whether said communication control processor has successfully reconfigured said network configuration information, and transmitting, from said communication control processor to said master host computer, a response message including information representative of whether said reconfiguring of said network configuration information has been executed successfully; and,
  updating, by said master host computer, second status information stored in correspondence with said reconfiguration sequence number in accordance with the contents of said response message received from said communication control processor.

15. The network reconfiguration information processing method according to claim 14, further comprising the steps of:
  in response to a request from said master host computer after the operation of said master host computer restarts, informing said master host computer, from said communication control processor, of all reconfiguration numbers and said first status information stored in said communication control processor; and,
  comparing, by said master host computer, said reconfiguration sequence numbers and said first status information received from said communication control processor with reconfiguration sequence numbers and second status information stored in said master host computer respectively, and specifying in accordance with the comparison result, a reconfiguration directory for which reconfiguration should be re-executed.

16. The network reconfiguration information processing method according to claim 14, further comprising the steps of:
  in response to a request from said master host computer after the operation of said host computer restarts, informing said master host computer, from said communication control processor, of all reconfiguration numbers and said first status information stored in said communication control processor;
  comparing, by said master host computer, said reconfiguration sequence numbers and said first status information received from said communication control processor with reconfiguration sequence numbers and said second status information stored in said master host computer; and,
  outputting a message for an operator, by said master host computer, when the comparison result indicates a presence of an inconsistency between said reconfiguration sequence numbers.

* * * * *

UNITED STATES PATENT AND TRADEMARK OFFICE
CERTIFICATE OF CORRECTION

PATENT NO. :   5,327,560
DATED      :   July 5, 1994
INVENTOR(S) :  Toshiaki Hirata, et al.

It is certified that error appears in the above-indentified patent and that said Letters Patent is hereby corrected as shown below:

Claim 9, column 24, line 31, delete "recognition" and substitute therefor --reconfiguration--.

Claim 14, column 25, line 51, delete "delete" and substitute therefor --deleted--.

Signed and Sealed this

Thirteenth Day of September, 1994

Attest:

BRUCE LEHMAN

*Attesting Officer*    *Commissioner of Patents and Trademarks*